(12) United States Patent
Dinan

(10) Patent No.: US 8,395,985 B2
(45) Date of Patent: *Mar. 12, 2013

(54) TIME ALIGNMENT IN MULTICARRIER OFDM NETWORK

(75) Inventor: Esmael Hejazi Dinan, Herndon, VA (US)

(73) Assignee: Ofinno Technologies, LLC, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/556,165

(22) Filed: Jul. 23, 2012

(65) Prior Publication Data

US 2013/0028239 A1 Jan. 31, 2013

Related U.S. Application Data

(60) Provisional application No. 61/511,544, filed on Jul. 25, 2011, provisional application No. 61/528,226, filed on Aug. 27, 2011, provisional application No. 61/556,045, filed on Nov. 4, 2011.

(51) Int. Cl.
- *H04J 11/00* (2006.01)
- *H04J 3/06* (2006.01)
- *H04W 4/00* (2009.01)
- *H04W 56/00* (2009.01)
- *H04L 7/00* (2006.01)
- *H04L 27/28* (2006.01)

(52) U.S. Cl. ........ 370/206; 370/252; 370/329; 370/350; 375/260; 375/356; 455/450; 455/502

(58) Field of Classification Search .......... 370/206, 370/252, 329, 350; 375/260, 356; 455/450, 455/502

See application file for complete search history.

(56) References Cited

U.S. PATENT DOCUMENTS

| | | | |
|---|---|---|---|
| 2007/0189205 A1* | 8/2007 | Terry et al. | 370/328 |
| 2009/0239545 A1* | 9/2009 | Lee et al. | 455/450 |
| 2010/0067470 A1* | 3/2010 | Damnjanovic et al. | 370/329 |
| 2010/0227569 A1* | 9/2010 | Bala et al. | 455/73 |
| 2010/0238872 A1* | 9/2010 | Kim et al. | 370/329 |
| 2011/0158116 A1* | 6/2011 | Tenny et al. | 370/252 |
| 2011/0261776 A1* | 10/2011 | Ahn et al. | 370/329 |
| 2011/0268032 A1* | 11/2011 | Kim et al. | 370/328 |
| 2011/0299489 A1* | 12/2011 | Kim et al. | 370/329 |
| 2012/0008600 A1* | 1/2012 | Marinier et al. | 370/336 |
| 2012/0063425 A1* | 3/2012 | Wang et al. | 370/336 |
| 2012/0076103 A1* | 3/2012 | Dai et al. | 370/329 |
| 2012/0113914 A1* | 5/2012 | Zhao et al. | 370/329 |
| 2012/0113941 A1* | 5/2012 | Chung et al. | 370/329 |
| 2012/0113962 A1* | 5/2012 | Jen | 370/336 |
| 2012/0170570 A1* | 7/2012 | Chang et al. | 370/350 |
| 2012/0178482 A1* | 7/2012 | Seo et al. | 455/501 |
| 2012/0218987 A1* | 8/2012 | Zhao et al. | 370/350 |
| 2012/0218988 A1* | 8/2012 | Xu et al. | 370/350 |
| 2012/0243498 A1* | 9/2012 | Kwon et al. | 370/329 |
| 2012/0250520 A1* | 10/2012 | Chen et al. | 370/241 |
| 2012/0257513 A1* | 10/2012 | Yamada | 370/248 |
| 2012/0287865 A1* | 11/2012 | Wu et al. | 370/329 |
| 2012/0300743 A1* | 11/2012 | Kim et al. | 370/329 |
| 2012/0307811 A1* | 12/2012 | Kwon et al. | 370/336 |

* cited by examiner

*Primary Examiner* — Alpus H Hsu

(74) *Attorney, Agent, or Firm* — Esmael Dinan; David Grossman

(57) ABSTRACT

A base station receives uplink signals from a wireless device and transmits at least one time alignment command computed based, at least in part, on timing of the received uplink signals. The time alignment command comprises a time adjustment value and an index identifying a carrier group.

19 Claims, 10 Drawing Sheets

Transmit at least one RRC message comprising a carrier group index identifying a carrier group in a plurality of carrier groups (comprising a first carrier group and a second carrier group)

↓

Transmit signals on the plurality of carriers

↓

Receive uplink signals on the plurality of carriers

↓

Transmit at least one time alignment command comprising a time adjustment value and an index identifying one carrier group, wherein uplink transmission timing of the first and second carrier groups:
- Employ different synchronization signals
- Adjusted in response to different time alignment commands

FIG. 10

TIME ALIGNMENT IN MULTICARRIER OFDM NETWORK

CROSS-REFERENCE TO RELATED APPLICATIONS

This application claims the benefit of U.S. Provisional Application No. 61/511,544, filed Jul. 25, 2011, entitled "Time Alignment in Multicarrier OFDM Network," and U.S. Provisional Application No. 61/528,226, filed Aug. 27, 2011, entitled "Carrier Configuration in Multicarrier Systems," and U.S. Provisional Application No. 61/556,045, filed Nov. 4, 2011, entitled "Multiple Timing Advances in Multicarrier Systems," which are hereby incorporated by reference in its entirety.

This application is related to co-pending Non-Provisional application Ser. No. 13/556,317, filed Jul. 24, 2012, entitled "Time Alignment in Multicarrier Systems."

BACKGROUND OF THE INVENTION

Example embodiments of the present invention enhance time alignment in a multicarrier OFDM communication system. Embodiments of the technology disclosed herein may be employed in the technical field of multicarrier communication systems. More particularly, the embodiments of the technology disclosed herein may relate to enhancing time alignment in a multicarrier OFDM communication system employing multiple timing advances.

FIG. 5 is a block diagram depicting a system 500 for transmitting data traffic generated by a wireless device 502 to a server 508 over a multicarrier OFDM radio according to one aspect of the illustrative embodiments. The system 500 may include a Wireless Cellular Network/Internet Network 507, which may function to provide connectivity between one or more wireless devices 502 (e.g., a cell phone, PDA (personal digital assistant), other wirelessly-equipped device, and/or the like), one or more servers 508 (e.g. multimedia server, application servers, email servers, or database servers) and/or the like.

As shown, the access network may include a plurality of base stations 503 . . . 504. Base station 503 . . . 504 of the access network may function to transmit and receive RF (radio frequency) radiation 505 . . . 506 at one or more carrier frequencies, and the RF radiation may provide one or more air interfaces over which the wireless device 502 may communicate with the base stations 503 . . . 504. The user 501 may use the wireless device (or UE: user equipment) to receive data traffic, such as one or more multimedia files, data files, pictures, video files, or voice mails, etc. The wireless device 502 may include applications such as web email, email applications, upload and ftp applications, MMS (multimedia messaging system) applications, or file sharing applications. In another example embodiment, the wireless device 502 may automatically send traffic to a server 508 without direct involvement of a user. For example, consider a wireless camera with automatic upload feature, or a video camera uploading videos to the remote server 508, or a personal computer equipped with an application transmitting traffic to a remote server.

Some example embodiments of the technology disclosed enhances time alignment in a multicarrier OFDM communication system employing multiple timing advances.

BRIEF SUMMARY OF THE INVENTION

According to some of the various aspects of embodiments, a wireless device may receive at least one radio resource control message from a base station. The at least one radio resource control message may cause configuration of a plurality of carriers comprising a first carrier and at least one second carrier. The at least one radio resource control message may comprise a carrier group index for a second carrier in the at least one second carrier. The carrier group index may identify a second carrier group. The second carrier group may be one of a plurality of carrier groups. The second carrier group may comprise a second subset of the at least one second carrier. The wireless device may receive from the base station, a control command. The control command may cause the wireless device to transmit a random access preamble on the second uplink carrier. The control command may comprise a preamble index corresponding to the random access preamble. The wireless device may transmit the random access preamble. Transmission timing of the random access preamble may be determined, at least in part, by employing a synchronization signal transmitted on one of at least one downlink carrier in the second carrier group.

According to some of the various aspects of embodiments, a base station may transmit at least one radio resource control message to a wireless device. The at least one radio resource control message may be configured to cause configuration of a plurality of carriers comprising a first carrier and at least one second carrier. The at least one radio resource control message may comprise a carrier group index for a second carrier in the at least one second carrier. The carrier group index may identify a second carrier group. The second carrier group may be one of a plurality of carrier groups. The second carrier group may comprise a second subset of the at least one second carrier. The base station may transmit to the wireless device a control command. The control command may be configured to cause the wireless device to transmit a random access preamble on the second uplink carrier. The control command may comprise a preamble index corresponding to the random access preamble. The base station may receive the random access preamble. Transmission timing of the random access preamble may be determined, at least in part, by employing a synchronization signal transmitted on one of at least one downlink carrier in the second carrier group.

BRIEF DESCRIPTION OF THE SEVERAL VIEWS OF THE DRAWINGS

Examples of several of the various embodiments of the present invention are described herein with reference to the drawings, in which:

FIG. 10 depicts an example flow chart for a time alignment process in a base station as per an aspect of an embodiment of the present invention.

DETAILED DESCRIPTION OF EMBODIMENTS

Example embodiments of the present invention enhance time alignment in a multicarrier OFDM communication system. Embodiments of the technology disclosed herein may be employed in the technical field of multicarrier communication systems. More particularly, the embodiments of the technology disclosed herein may relate to enhancing time alignment in a multicarrier OFDM communication system employing multiple timing advances.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
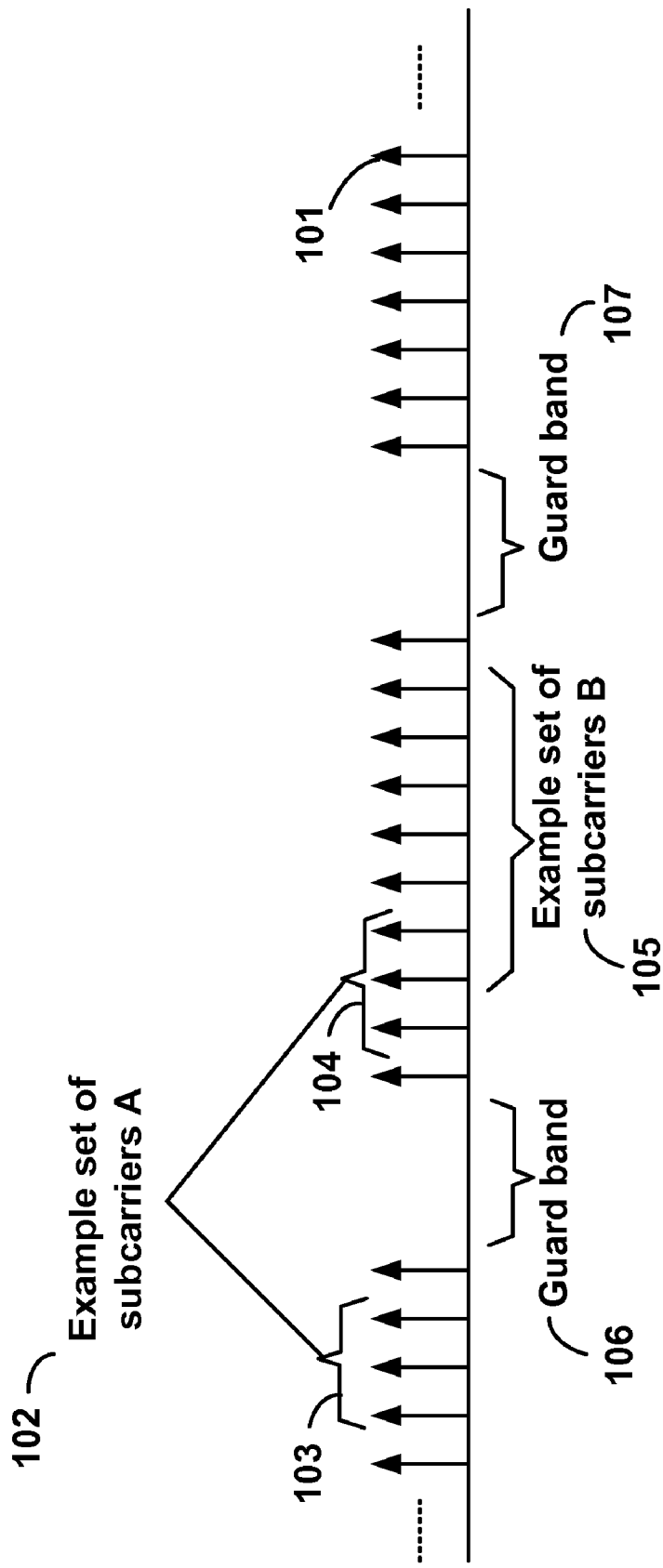
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
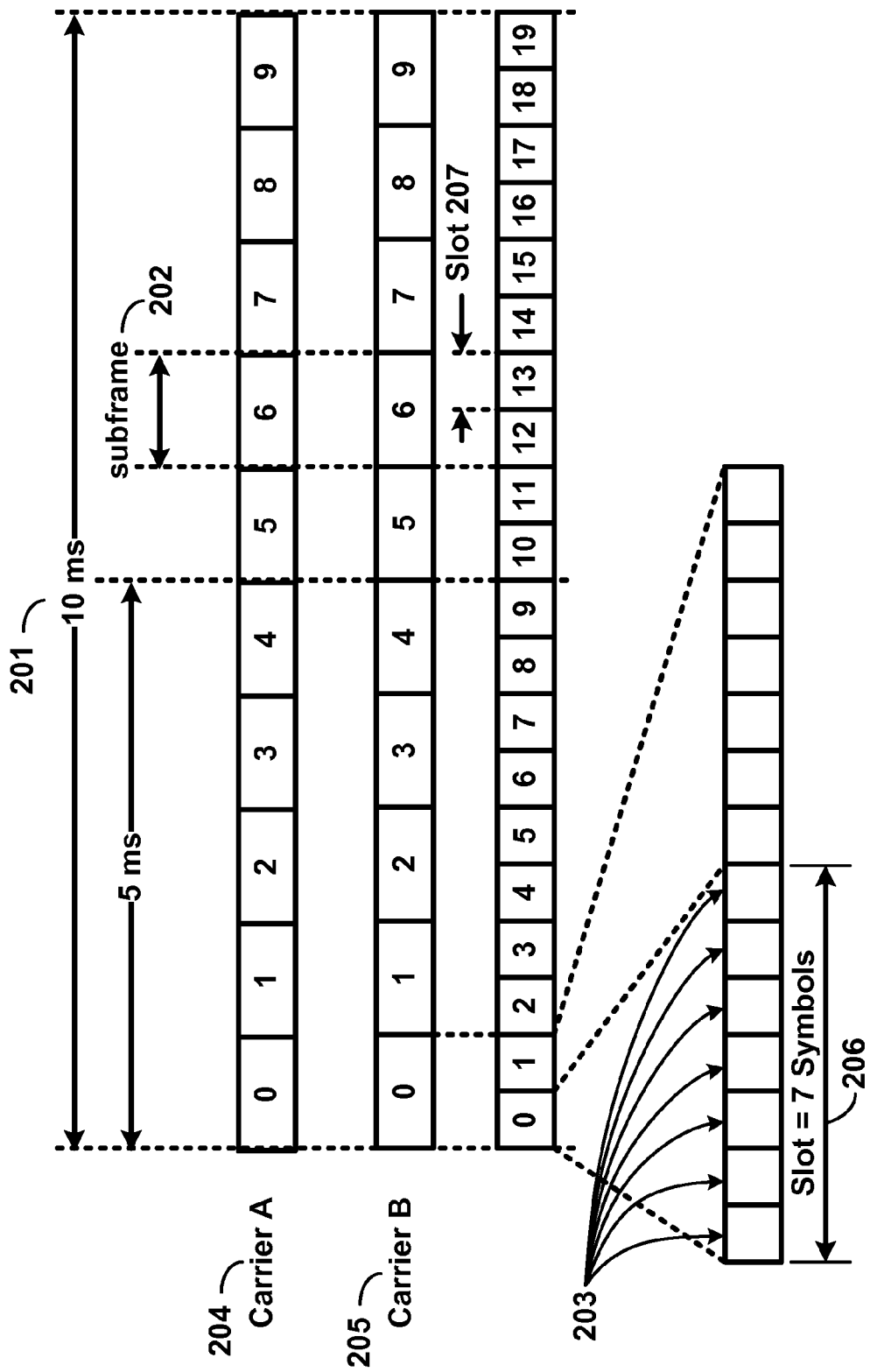
FIG. 2 is a diagram depicting an example transmission time and reception time for two carriers as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized sub-frames 202. Other sub-frame durations such as including 0.5 msec, 1 msec, 2 msec, and 5 msec may also be supported. Sub-frame(s) may consist of two or more slots 206. For the example of FDD, 10 sub-frames may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

In an example case of TDD, uplink and downlink transmissions may be separated in the time domain. According to some of the various aspects of embodiments, each 10 ms radio frame may include two half-frames of 5 ms each. Half-frame(s) may include eight slots of length 0.5 ms and three special fields: DwPTS (Downlink Pilot Time Slot), GP (Guard Period) and UpPTS (Uplink Pilot Time Slot). The length of DwPTS and UpPTS may be configurable subject to the total length of DwPTS, GP and UpPTS being equal to 1 ms. Both 5 ms and 10 ms switch-point periodicity may be supported. In an example, subframe 1 in all configurations and subframe 6 in configurations with 5 ms switch-point periodicity may include DwPTS, GP and UpPTS. Subframe 6 in configurations with 10 ms switch-point periodicity may include DwPTS. Other subframes may include two equally sized slots. For this TDD example, GP may be employed for downlink to uplink transition. Other subframes/fields may be assigned for either downlink or uplink transmission. Other frame structures in addition to the above two frame structures may also be supported, for example in one example embodiment the frame duration may be selected dynamically based on the packet sizes.

Figure 3:
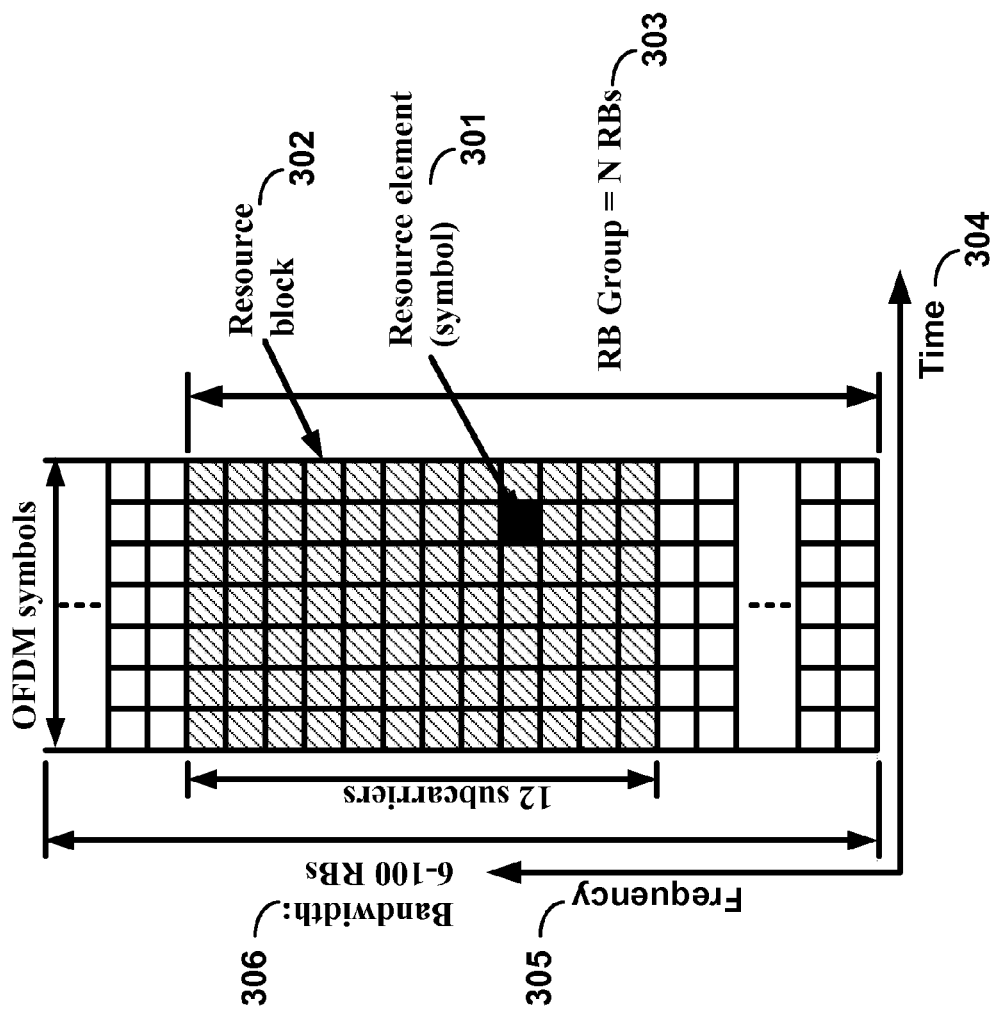
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec.

Physical and virtual resource blocks may be defined. A physical resource block may be defined as N consecutive OFDM symbols in the time domain and M consecutive subcarriers in the frequency domain, wherein M and N are integers. A physical resource block may include M×N resource elements. In an illustrative example, a resource block may correspond to one slot in the time domain and 180 kHz in the frequency domain (for 15 KHz subcarrier bandwidth and 12 subcarriers). A virtual resource block may be of the same size as a physical resource block. Various types of virtual resource blocks may be defined (e.g. virtual resource blocks of localized type and virtual resource blocks of distributed type). For various types of virtual resource blocks, a pair of virtual resource blocks over two slots in a subframe may be assigned together by a single virtual resource block number. Virtual resource blocks of localized type may be mapped directly to physical resource blocks such that sequential virtual resource block k corresponds to physical resource block k. Alternatively, virtual resource blocks of distributed type may be mapped to physical resource blocks according to a predefined table or a predefined formula. Various configurations for radio resources may be supported under an OFDM framework, for example, a resource block may be defined as including the subcarriers in the entire band for an allocated time duration.

According to some of the various aspects of embodiments, an antenna port may be defined such that the channel over which a symbol on the antenna port is conveyed may be inferred from the channel over which another symbol on the same antenna port is conveyed. In some embodiments, there may be one resource grid per antenna port. The set of antenna port(s) supported may depend on the reference signal configuration in the cell. Cell-specific reference signals may support a configuration of one, two, or four antenna port(s) and may be transmitted on antenna port(s) {0}, {0, 1}, and {0, 1, 2, 3}, respectively. Multicast-broadcast reference signals may be transmitted on antenna port 4. Wireless device-specific reference signals may be transmitted on antenna port(s) 5, 7, 8, or one or several of ports {7, 8, 9, 10, 11, 12, 13, 14}. Positioning reference signals may be transmitted on antenna port 6. Channel state information (CSI) reference signals may support a configuration of one, two, four or eight antenna port(s) and may be transmitted on antenna port(s) 15, {15, 16}, {15, . . . , 18} and {15, . . . , 22}, respectively. Various configurations for antenna configuration may be supported depending on the number of antennas and the capability of the wireless devices and wireless base stations.

According to some embodiments, a radio resource framework using OFDM technology may be employed. Alternative embodiments may be implemented employing other radio technologies. Example transmission mechanisms include, but are not limited to: CDMA, OFDM, TDMA, Wavelet technologies, and/or the like. Hybrid transmission mechanisms such as TDMA/CDMA, and OFDM/CDMA may also be employed.

Figure 4:
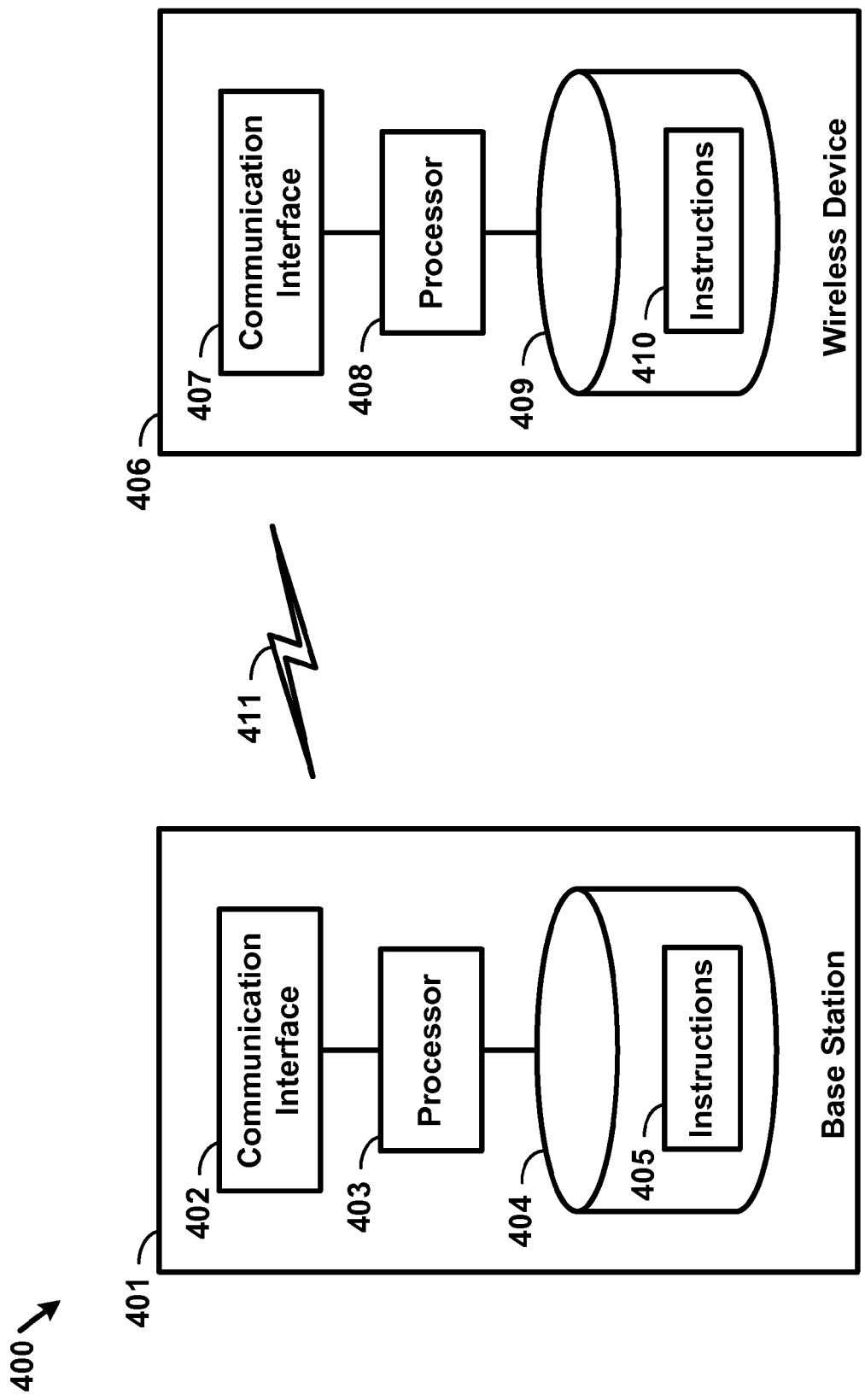
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3. and associated text.

Figure 5:
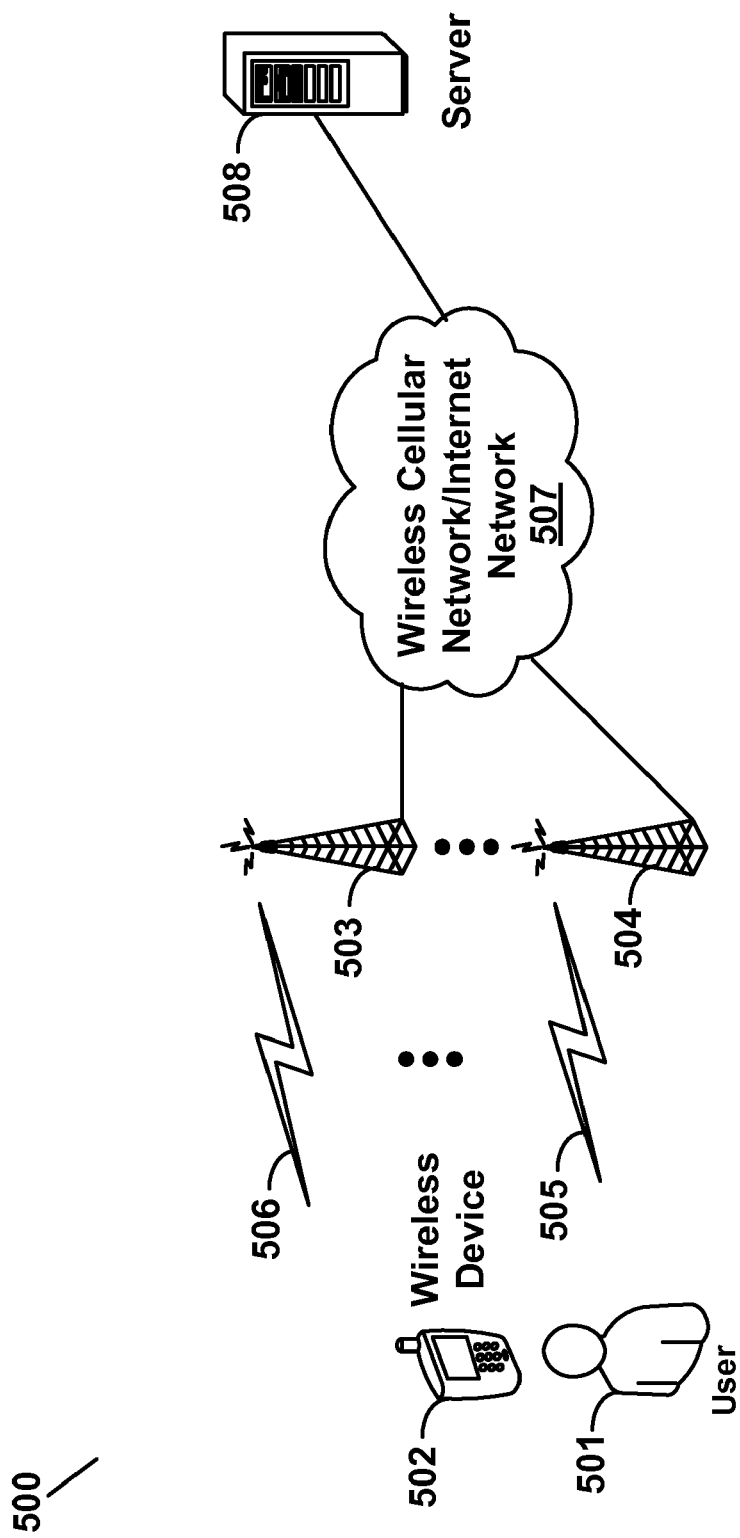
FIG. 5 is a block diagram depicting a system for transmitting data traffic over an OFDM radio system as per an aspect of an embodiment of the present invention.

FIG. 5 is a block diagram depicting a system 500 for transmitting data traffic generated by a wireless device 502 to a server 508 over a multicarrier OFDM radio according to one aspect of the illustrative embodiments. The system 500 may include a Wireless Cellular Network/Internet Network 507, which may function to provide connectivity between one or more wireless devices 502 (e.g., a cell phone, PDA (personal digital assistant), other wirelessly-equipped device, and/or the like), one or more servers 508 (e.g. multimedia server, application servers, email servers, or database servers) and/or the like.

It should be understood, however, that this and other arrangements described herein are set forth for purposes of example only. As such, those skilled in the art will appreciate that other arrangements and other elements (e.g., machines, interfaces, functions, orders of functions, etc.) may be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic in combination with hardware. For instance, various functions may be carried out by a processor executing a set of machine language instructions stored in memory.

As shown, the access network may include a plurality of base stations 503 . . . 504. Base station 503 . . . 504 of the access network may function to transmit and receive RF (radio frequency) radiation 505 . . . 506 at one or more carrier frequencies, and the RF radiation may provide one or more air interfaces over which the wireless device 502 may communicate with the base stations 503 . . . 504. The user 501 may use the wireless device (or UE: user equipment) to receive data traffic, such as one or more multimedia files, data files, pictures, video files, or voice mails, etc. The wireless device 502 may include applications such as web email, email applications, upload and ftp applications, MMS (multimedia messaging system) applications, or file sharing applications. In another example embodiment, the wireless device 502 may automatically send traffic to a server 508 without direct involvement of a user. For example, consider a wireless camera with automatic upload feature, or a video camera uploading videos to the remote server 508, or a personal computer equipped with an application transmitting traffic to a remote server.

One or more base stations 503 . . . 504 may define a corresponding wireless coverage area. The RF radiation 505 . . . 506 of the base stations 503 . . . 504 may carry communications between the Wireless Cellular Network/Internet Network 507 and access device 502 according to any of a variety of protocols. For example, RF radiation 505 . . . 506 may carry communications according to WiMAX (Worldwide Interoperability for Microwave Access e.g., IEEE 802.16), LTE (long term evolution), microwave, satellite, MMDS (Multichannel Multipoint Distribution Service), Wi-Fi (e.g., IEEE 802.11), Bluetooth, infrared, and other protocols now known or later developed. The communication between the wireless device 502 and the server 508 may be enabled by any networking and transport technology for example TCP/IP (transport control protocol/Internet protocol), RTP (real time protocol), RTCP (real time control protocol), HTTP (Hypertext Transfer Protocol) or any other networking protocol.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

Example embodiments of the invention may enhance time alignment in a multicarrier OFDM communication system. Other example embodiments may comprise a non-transitory tangible computer readable media comprising instructions executable by one or more processors to cause time alignment in a multicarrier OFDM communication system. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enhance time alignment in a multicarrier OFDM communication system. The device may include processors, memory, interfaces, and/or the like. Other example embodiments may comprise communication networks comprising devices such as base stations, wireless devices (or user equipment: UE), servers, switches, antennas, and/or the like.

A base station may transmit configuration messages to a wireless device causing configuration of a first (primary) carrier and one or more second (secondary) carriers in the wireless device. Serving carriers having uplink to which the same time alignment applies may be grouped in a carrier group. Serving carriers in one carrier group may use the same timing reference. For a given carrier group, a wireless device may use one active downlink carrier as the timing reference at a given time. For a given carrier group, a wireless device may employ the same timing reference for uplink subframes and frames transmission timing of the uplink carriers belonging to the same carrier group. According to some of the various aspects of embodiments, serving carriers having uplink to which the same time alignment applies may correspond to the serving carriers hosted by the same receiver. A carrier group comprises at least one serving carrier with configured uplink. A wireless device supporting multiple carrier groups may support two or more carrier groups. One carrier group contains the first carrier and may be called a first carrier group. In a multiple carrier group configuration, at least one carrier group, called a second carrier group, may contain one or more second carriers and may not contain the first carrier. Carriers within the same carrier group may use the same time alignment value and the same timing reference.

To obtain initial uplink time alignment for a second carrier group, base station may initiate random access procedure. In a second carrier group, wireless device may use one of any activated second carriers from the second carrier group as a timing reference carrier. There may be one timing reference and one time alignment timer (time alignment timer) per carrier group. Time alignment timer for carrier groups may be configured with different values. When the time alignment timer associated with the first carrier group expires, all time alignment timers may be considered as expired and the wireless device may flush all HARQ buffers of all serving carriers, may clear any configured downlink assignment/uplink grants, and RRC may release PUCCH/SRS for all configured serving carriers. When the first carrier group time alignment timer is not running, a second carrier group time alignment timer may not be running. When the time alignment timer associated with second carrier group expires: a) SRS transmissions may be stopped on the corresponding second carriers, b) the type-0 SRS configuration may be released, the type-1 SRS configuration may be maintained, c) CSI reporting configuration for the corresponding second carriers may be maintained, and/or d) MAC may flush the uplink HARQ buffers of the corresponding second carriers.

Upon deactivation of the last active second carrier in a second carrier group, the wireless device may not stop time alignment timer of the second carrier group. Upon removal of the last second carrier in a second carrier group, time alignment timer of the carrier group may not be running. Random access procedures in parallel may not be supported for a wireless device. If a new random access procedure is requested (either by wireless device or network) while another random access procedure is already ongoing, it may be up to the wireless device implementation whether to continue with the ongoing procedure or start with the new procedure. The base station may initiate the random access procedure via a PDCCH order for an activated second carrier. This PDCCH order may be sent on the scheduling carrier of this second carrier. When cross carrier scheduling is configured for a carrier, the scheduling carrier may be different than the carrier that is employed for preamble transmission. Non-contention based random access procedure may be supported for second carriers of a second carrier group. Upon new uplink data arrival the wireless device may not trigger a random access procedure on a second carrier. PDCCH order for preamble transmission may be sent on a different serving carrier than the second carrier in which the preamble is sent. Carrier grouping may be performed without requiring any additional wireless device assisted information.

A wireless device may transmit a scheduling request and/or a buffer status report due to uplink data arrival in the wireless device. A wireless device may transmit a scheduling request when wireless device has data for uplink transmission and wireless device does not receive uplink grants for transmission of buffer status report. Wireless device may transmit a medium access control buffer status report in the uplink to inform the base station about the size of the uplink transmission buffer. A wireless device buffer status report may be transmitted in an uplink resource identified in a received uplink grant. In response to receiving buffer status report, the base station may, selectively and depending on a plurality of criteria, transmit a PDCCH order to the wireless device and may cause the wireless device to start random access procedure on a second carrier (in case of carrier aggregation). A PDCCH order may be triggered by the buffer status report reception due to the uplink data arrival in the wireless device. Preamble transmission may be triggered in the case of uplink data arrival, meaning that preamble transmission may be triggered by the buffer status report reception in the base station. Upon new uplink data arrival the wireless device may not trigger a random access procedure on a second carrier. The base station may trigger the random access procedure based on the buffer status report reception due to uplink data arrival in the wireless device. Base station may consider many parameters in triggering random access on a second carrier, for example, current base station load, wireless device buffer size(s) in buffer status report report(s), wireless device category, wireless device capability, QoS requirements, and/or the like.

Initial timing alignment may be achieved through random access procedure. This involves the wireless device transmitting a random access preamble and the base station responding an initial time alignment command with a time alignment value within the random access response window. The start of the random access preamble may be aligned with the start of the corresponding uplink subframe at the wireless device assuming time alignment value of zero. The base station may estimate the uplink timing from the random access preamble transmitted by the wireless device. Then the time alignment command may be derived by the base station based on the estimation of the difference between the desired uplink timing and the actual uplink timing. The wireless device may determine the initial uplink transmission timing relative to the corresponding downlink of the second carrier group on which the preamble is transmitted. PDCCH order may be used to trigger random access process for an activated second carrier. For a newly configured second carrier or a configured but deactivated second carrier, base station may need to firstly activate the corresponding second carrier and then trigger random access process on it.

According to some of the various aspects of embodiments, a base station may communicate with a mix of wireless devices. Wireless devices may support multiple technologies, or multiple releases of the same technology depending on wireless device category and/or capability. A base station may comprise multiple sectors. When specification refers to a base station communicating with a plurality of wireless devices, specification may refer to a subset of the total wireless devices in the coverage area. Specification may refer to for example a plurality of wireless devices of a given LTE release with a given capability and in a given sector of the base station. The plurality of wireless devices in the specification may refer to a selected plurality of wireless devices, or a subset of total wireless devices in the coverage area, which perform according to the disclosed methods. There may be many wireless devices in the coverage area that may not comply with the disclosed methods, for example because those wireless devices perform based on older releases of LTE technology. The number of time alignment commands transmitted by the base station to a wireless device in a given period may depend, at least in part, on many parameters including at least one of: a) speed that the wireless device moves in the coverage area, b) direction that the wireless device moves in the coverage area, c) coverage radius, d) number of active wireless devices in the coverage area, and/or the like.

According to some of the various aspects of embodiments, the mapping of a serving carrier to a carrier group may be configured by the serving base station with RRC signaling. When needed, the mapping between a second carrier and a carrier group may be reconfigured with RRC signaling. The mapping between a second carrier and a carrier group may not be reconfigured with RRC while the second carrier is configured. The first carrier may not change carrier group and may always be a member of the first carrier group. When a base station performs second carrier addition configuration, the related carrier group configuration may be configured for the second carrier. Base station may modify carrier group configuration of a second carrier by removing (releasing) the second carrier and adding a new second carrier (with same physical carrier ID and frequency) with an updated carrier group index. The new second carrier with the updated carrier group index may be initially inactive subsequent to joining the updated carrier group index. Base station may activate the updated new second carrier and then start scheduling packets on the activated second carrier. It may not be possible to change the carrier group associated with a second carrier but rather the second carrier needs to be removed and a new second carrier needs to be added with another carrier group.

A base station may perform initial configuration based on an initial configuration parameters received from a network node (for example a management platform), an initial base station configuration, wireless device location, wireless device type, wireless device CSI feedback, wireless device uplink transmissions (for example, data, SRS, and/or the like), a combination of the above, and/or the like. For example, initial configuration may be based on wireless device channel state measurements. For example, depending on the signal quality received from a wireless device on various second carriers downlink carrier or by determination of wireless device being in repeater coverage area, or a combination of both, a base station may determine the initial configuration of first and second carrier groups and membership of second carriers to carrier groups.

In an example implementation, the time alignment value of a serving carrier may change, for example due to wireless device's mobility from a macro to a repeater or an RRH (remote radio head) coverage area. The signal delay for that second carrier may become different from the original value and different from other serving carriers in the same carrier group. In this scenario, base station may relocate this time alignment-changed serving carrier to another existing carrier group. Or alternatively, the base station may create a new carrier group for the second carrier, based on the updated time alignment value. Time alignment value may be derived for example through base station measurement of signal reception timing, random access procedure, and/or other standard or proprietary algorithms. A base station may realize that the time alignment value of a serving carrier is no longer consistent with its current carrier group. There may be many other scenarios which require base station to reconfigure carrier groups. During reconfiguration, the base station may need to move the reference second carrier belonging to a second carrier group to another carrier group. In this scenario, the second carrier group would require a new reference second carrier. In an example embodiment, the wireless device may select an active second carrier in the second carrier group as the reference timing second carrier.

Base station may consider wireless device's capability in configuring multiple carrier groups for a wireless device. Wireless device may be configured with a configuration that is compatible with wireless device capability. Multiple carrier group capability may be an optional feature in LTE release 11 and per band combination of multiple carrier group capability may be introduced. Wireless device may transmit its multiple carrier group capability to base station via an RRC message and base station may consider wireless device capability in configuring carrier group configuration of the wireless device.

The time alignment maintenance for the first carrier and first carrier group may follow Rel-10 principles. If a second carrier applying the time alignment of the first carrier is added to the first carrier group, the Rel-10 procedures may be reused. In one example embodiment, there is no need to assign a carrier group index for the first carrier group. Second carriers grouped with the first carrier may be grouped implicitly and a carrier group index for the first carrier group may not be needed or a carrier group index may be assigned implicitly by default (for example, carrier group index 0). Carrier group index may be regarded as zero if the carrier group index field is absent upon second carrier addition. If a second carrier is not configured with a carrier group index, it may apply that the second carrier belongs to first carrier group.

According to some of the various aspects of embodiments, a wireless device may select one second carrier downlink in a secondary carrier group as the downlink timing reference carrier for the secondary carrier group. This may reduce signaling overhead or complexity of implementation and/or increase efficiency. For a wireless device, a second carrier group may have one timing reference carrier. In an example embodiment, the active second carrier with the highest signal quality may be selected as the timing reference second carrier by the wireless device. In another example embodiment, downlink timing reference carrier for a second carrier group may be the second downlink carrier associated with the second uplink carrier where random access process was performed. For preamble transmission, the corresponding downlink of the carrier which the preamble is sent may be used as downlink timing reference. In an example embodiment, wireless device may autonomously select a downlink carrier of an active carrier in the second carrier group as the reference second carrier. When time alignment command is received in random access response or timing alignment command for a carrier group, the wireless device may apply the time alignment value to current uplink timing of the corresponding carrier group.

In an example embodiment, the second carrier served as the timing reference carrier in second carrier group may be deactivated in some cases. In a wireless device, when a second carrier is inactive, the wireless device may switch off some parts of the receiver and/or transmitter corresponding to the second carrier. This act may reduce battery power consumption in the wireless device. In another example embodiment, the reference second carrier in a second carrier group may be released by the serving base station. The timing reference carrier may be changed to another active second carrier in the second carrier group for maintaining uplink timing alignment for second carriers in the same second carrier group. Change of timing reference carrier in a second carrier group may be supported. The reference carrier may also be changed for other reasons such as coverage quality, random access process failure, reference second carrier release, subscriber mobility, a combination of the above, and/or the like. In an example embodiment, when the reference timing second carrier is released or is deactivated, the wireless device may autonomously change the timing reference carrier to another active second carrier in the second carrier group. For example, initially downlink second carrier in which random access is transmitted may be used as a timing reference and then the wireless device may use another second carrier in the carrier group as the timing reference, when the reference second carrier needs to be changed.

A preamble may be sent by a wireless device in response to the PDCCH order on a second carrier belonging to a second carrier group. Preamble transmission for second carriers may be controlled by the network using PDCCH order. Random access response message in response to the preamble transmission on second carrier may be addressed to RA-CRNTI in the first carrier common search space. Once the random access preamble is transmitted, the wireless device (that transmitted the preamble) may monitor the PDCCH of the first carrier for random access response(s). Wireless device may monitor the PDCCH in the random access response window. The wireless device may stop monitoring for random access response(s) after successful reception of a random access response containing a random access preamble identifier that matches the transmitted random access preamble.

If the random access response contains a random access preamble identifier corresponding to the transmitted random access preamble, the wireless device may consider this random access response reception successful and apply the random access response for the serving carrier where the random access preamble was transmitted. The wireless device may process the received timing advance command. The wireless device may process the received uplink grant value and indicate it to the lower layers. In an example implementation, the second carrier index in the uplink grant may not be transmitted in the uplink grant in random access response and the uplink grant contained in the random access response may be applicable to the carrier where the preamble was sent. According to some of the various aspects of embodiments, preamble identifier may be included in a random access response to address possible preamble misdetection by the base station. Wireless device may compare the preamble identifier in random access response with the transmitted preamble identifier to verify the validity of the random access response and to verify possible preamble misdetection by base station. The base station may transmit at least one RRC message to a wireless device causing configuration of random access resources in a wireless device. In the first carrier group, random access resources may be configured on the first carrier, and no second carrier in the first carrier group may be configured with random access resources. One or more second carriers in a second carrier group may be configured with random access resources. This may allow the base station to trigger random access process on any one of the second carriers (in the second carrier group) that is configured with random access resources. For the first carrier group, random access process may be performed only on the first carrier. This feature may provide flexibility to the base station in selecting a second carrier for random access process in a second carrier group. It may be noted that carrier configuration may be wireless device specific, and two wireless devices may be configured with different first carrier and different carrier group configurations.

If a wireless device receives an RRC message that causes the wireless device to be configured to transmit sounding reference signal on a second carrier, the wireless device may transmit sounding reference signal if the second carrier is in-sync. The second carrier is in-sync, if time alignment timer for the corresponding second carrier group is running. In an example embodiment, if a second carrier is configured and is associated with a second carrier group that is out-of-sync (time alignment timer is not running), the base station may initiate random access process on a second carrier in the second carrier group. In response to successful completion of random access process in the second carrier group, the wireless device may start sounding reference signal transmission on uplink carriers of second carriers (in the second carrier group) with configured sounding reference signal transmission. Wireless device may not transmit sounding reference signal in the uplink of a second carrier belonging to an out-of-sync second carrier group. When sounding reference signal is configured for a second carrier belonging to an out-of-sync second carrier group, a wireless device may not send sounding reference signal until wireless device receives a random access response including a time alignment value, and an uplink grant, because otherwise sounding reference signal may be sent with incorrect transmission power and/or timing. Uplink grant may include power control information. The wireless device may receive time alignment value, uplink resources and a power control command to adjust the uplink transmission timing and power before the wireless device starts to send sounding reference signal (if configured for the second carrier).

If no random access response is received within the random access response window, or if none of all received random access responses contains a random access preamble identifier corresponding to the transmitted random access preamble, the random access response reception may be considered not successful and the wireless device may increment a preamble transmission counter by one. If the counter reaches a predefined value and if the random access preamble is transmitted on the first carrier, wireless device may indicate a random access problem to RRC layer. The first carrier group may be considered out of sync, and uplink transmissions (except transmission of an uplink preamble) may stop. RRC layer may indicate a radio link failure. If the counter reaches a predefined value and if the random access preamble is transmitted on a second carrier, wireless device may consider the random access procedure unsuccessfully completed. The wireless device may not indicate a random access problem to RRC layer in this case, and no radio link failure may be indicated. The wireless device may continue uplink transmissions on that carrier group. The time alignment state of the carrier group may remain in-sync if the time alignment timer is running.

LTE Rel-8, 9 & 10 timing advance (alignment) command MAC control element (CE) has a fixed size of one octet and contains 2 reserved bits (R bits). LTE Rel-8, 9 & 10 supports only one carrier group and there is no need to indicate to which carrier group the time alignment command may apply. The time alignment command is applied to uplink carriers including first carrier and second carrier(s) of a wireless device. There is a need for enhancing the time alignment procedure in LTE Rel-8, 9 & 10 to efficiently support multiple carrier groups. In release 11 or above, when multiple carrier groups are configured, a MAC CE identifying the carrier group to which the time alignment value applies may be used. The R bits may be employed to signal the carrier group to which the time alignment value applies. The R bits of the timing advance command MAC control elements may be employed to signal the time alignment group. In this embodiment, one time alignment is included in a MAC CE. If multiple time alignment, each for a different carrier group, need to be transmitted, then multiple CEs may be transmitted.

According to some of the various aspects of embodiments, when the R bits are set to 0, MAC CE indicates the carrier group of the first carrier (first carrier group) and other values are addressed to other carrier groups (second carrier groups). This would allow for a maximum of four time alignment groups. Zero may be used for the R bits correspond to first carrier group, and other values may be used for second carrier groups. This solution may reduce the changes to the release 8, 9, 10 MAC layer, and enhance the MAC CE time alignment command to multiple carrier groups. RRC layer may configure carrier groups for a second carrier (implicitly or explicitly) and may assign a carrier group index to a carrier group. The index that is introduced for a carrier group in RRC may be employed for the setting of the R bits. Carrier group index configured by RRC may be used to indicate carrier group where the time alignment command applies. This may imply that the RRC signaling may configure up to 4 carrier group indices.

One carrier group in one time alignment command may be supported. R.11 or above wireless devices may check R bits in MAC CE, but R.10 or below wireless devices may not need to check the R bits. According to some of the various aspects of embodiments, an R.11 or above wireless device with one configured carrier group (first carrier group) may not need to check the R bits. A 6-bit time alignment value may be associated with a carrier group using 2-bit carrier group index. This enhancement may support transmitting time alignment value for a specific carrier group without adding the size of MAC CE command compared to release 8, 9, 10. Two bits of carrier group index bits are introduced before the 6 bits of time alignment value. This may require a new definition for MAC CE command that would be applicable to release 11 or above wireless devices. A method to introduce this new MAC CE command is to introduce a new MAC LCID for this new format. This is a viable implementation option. This may increase the number of used MAC LCIDs. An embodiment is introduced here that would allow to use the same MAC LCID as in Rel-8, 9 & 10 for Rel-11 multiple carrier group configuration. The same LCID as in Rel-8, 9 & 10 may be used in this embodiment applicable to multiple carrier group configuration in release 11 or beyond. Base station transmits time alignment MAC CEs to wireless devices in unicast messages. Base station has the information about the current LTE release supported by the wireless device. This information may be available to the base station via network signaling or via air interface signaling (wireless device capability message received from the wireless device). Base station may use the same LCID for the legacy time alignment MAC CE and the newly introduced time alignment MAC CE. If the MAC CE is transmitted to the release 8, 9, 10 LTE wireless devices, then the R bits may not include a carrier group index. If the MAC CE is transmitted to the release 11 or above wireless devices, then the R bits may include the carrier group index if multiple carrier groups are configured. If multiple carrier groups are not configured, then time alignment value is applied all the configured and active carriers.

This enhancement may not require introducing a new LCID, although a new MAC CE format is introduced for transmitting time alignment commands. Both legacy time alignment MAC CEs and new time alignment MAC CEs may use the same LCID and that reduces the number of LCIDs used in the MAC layer (compared with the scenario where a new LCID is introduced) and may further simplify wireless device implementation. Base station may consider wireless device LTE release or may consider the number of configured carrier groups (1 for first carrier group only configuration, more than 1 for first carrier group and second carrier group configuration) to decide if legacy MAC CE format should be used or new MAC CE format should be used. If a wireless device is a release 8, 9, 10, then legacy MAC CE is used. For release 11 or above wireless devices with one carrier group configuration (only first carrier group), base station may use legacy MAC CE, or use new MAC CEs with RR bits set to first carrier group index (for example 0 for first carrier group). For release 11 or above wireless devices (or for release 11 or above wireless devices with multiple carrier group configuration), base station may use the new MAC CE format, wherein RR bits set to the carrier group index, which was configured in wireless device employing RRC configuration messages.

In an example, wireless devices (for example: wireless device1, wireless device2) communicating with a base station may support different releases of LTE technology. For example, wireless device2 may support releases 8, 9, 10, and 11 of LTE, and wireless device1 may support releases 8, 9 and 10 (or for example may support release 8, or may support 8 & 9). In another example, wireless devices (for example: wireless device1, wireless device2) communicating with a base station may support different capabilities of LTE technology. For example, wireless device2 may support multiple carrier groups, and wireless device1 may not support multiple carrier groups. Base station may send MAC time alignment CEs to the wireless devices (wireless device1, wireless device2) in unicast messages. MAC time alignment CEs may have the same LCID for wireless device1 and wireless device2. The wireless devices (wireless device1, wireless device2) may interpret MAC time alignment CE messages for adjusting uplink timing differently dependent on the LTE release they support and are operating. The same exact message may be processed differently by wireless device1 and wireless device2. For example, in a scenario, where MAC LCID indicate MAC time alignment CE, and RR field is 00, wireless device1 may not consider the value of the two bits before time alignment value (RR). Wireless device1 may change the uplink transmission timing for all configured and active uplink carriers according to the time alignment value in the MAC command. Wireless device2 may however, decode the value of two bits before time alignment value (RR=carrier group index), and when the two bits are for example 00, wireless device1 may only update the transmission timing for active carriers belonging to first carrier group according to the time alignment value. The first two bits may indicate the carrier group index to which the time alignment may apply. Therefore, the same MAC CE message content may be processed differently by different wireless devices operating in different LTE releases. In another example embodiment, multiple carrier groups feature may be an optional feature in release 11. Wireless device1 may be a release 11 wireless device without multiple carrier group capability. Wireless device2 may be a release 11 (or above) wireless device with multiple carrier group capability. A wireless device with multiple carrier group capability may also operate in a single time alignment mode depending on base station release and/or network configuration (one carrier group configuration). For example, when a multiple carrier group release 11 wireless device communicate to a release 10 base station, it may interpret all base station commands as release 10 commands.

According to some of the various aspects of embodiments, a base station may transmit a plurality of unicast timing advance commands to a plurality of wireless devices for adjusting uplink transmission timing by the plurality of wireless devices. Each of the plurality of wireless devices may operate in a mode. The mode may comprise: a) a first mode employable by all of the plurality of wireless devices, or a second mode employable only by a subset of the plurality of wireless devices. Each of the plurality of wireless devices being addressed by at least one of the plurality of unicast timing advance commands may interpret differently the at least one of the plurality of unicast timing advance commands depending on the mode in which each of the plurality of wireless devices is operating. The plurality of unicast timing advance commands may have the same format for the plurality of wireless devices operating in the first mode and the plurality of wireless devices operating in the second mode. The format may comprise: a) a subheader being the same for the plurality of unicast timing advance commands, and b) a control element comprising a timing advance value. The first mode may be configured to be compatible with release 10 of LTE-Advance technology. The second mode may be configured to be compatible with release 11 of LTE-Advance technology.

During the connection establishment process, a base station may transmit a first control message to a wireless device (wireless device) on a first downlink carrier of a first carrier to establish a first signaling bearer with the wireless device on the first carrier. The wireless device may transmit radio capability parameters to the base station on the first signaling bearer on a first uplink carrier of the first carrier.

According to some of the various aspects of embodiments, radio capability parameters may include a parameter indicating support for multiple carrier groups. Support for multiple carrier groups may be considered an optional feature in release 11, and a base station may not know if a wireless device supports multiple carrier groups capabilities until it receives a wireless device capability message from the wireless device indicating that the wireless device supports multiple carrier groups feature. Before base station configures first carrier group and second carrier group(s), base station may receive and process wireless device capability regarding wireless device multiple carrier groups capabilities. Supporting multiple carrier group capability may require that wireless device includes new hardware and/or software features that provide such a capability. Multiple time alignment capability may be an optional capability for Rel-11 wireless device and its support may depend on wireless device's hardware, DSP, software designs, and/or the like. A wireless device may send at least one time alignment capability parameter to the base station. Base station may configure wireless device's second carrier group(s) and first carrier group within the wireless device capability. For example, a wireless device may indicate how many second carrier groups it may support. Base station may configure wireless device second carrier group(s) based, at least in part, on the number of supported second carrier groups in a wireless device. In another example, wireless device may explicitly or implicitly indicate if it supports inter-band or intra-band multiple carrier groups, or both. In an example embodiment, support for multiple carrier groups may be mandatory in release 11. A base station may find out about multiple carrier group capability employing information exchanged between the wireless device and the base station.

According to some of the various aspects of embodiments, multiple carrier group capability may be explicitly or implicitly communicated to base station. In an example embodiment, inter-band and/or intra-band carrier aggregation may be configured with multiple carrier groups. Wireless device may send multiple carrier group capability based on each supported band combinations. Wireless devices that could be configured with inter-band carrier aggregation may need multiple carrier groups (multiple time alignment) configuration. Carriers in a band may experience a different delay compared with a different band and a band may need its own carrier group configuration. A carrier group configuration for carriers for a band may be required. In a multiple band wireless device, multiple carrier groups may be configured, for example one carrier group per band. Wireless device may comprise a plurality of RF chains to support inter-band carrier aggregation. A wireless device may support multiple carrier groups if the wireless device support inter-band carrier aggregation. In an example embodiment, when a wireless device transmits wireless device band combination information for inter-band carrier aggregation, it may imply that that wireless device supports multiple carrier groups for those bands, and transmission of a separate information element for multiple carrier group capability may not be required.

A wireless device transceiver architecture may support non-contiguous and/or contiguous carrier aggregation in intra-band. Wireless device may support multiple carrier groups in partial or all supportable intra-band carrier aggregation. Support for multiple carrier groups may depend on wireless device structure, and some wireless devices may not support intra-band multiple carrier group configurations depending on wireless devices transceiver structure. In an example embodiment, a wireless device may communicate its multiple carrier group capability to the base station for intra-band communication. A wireless device may transmit the multiple carrier group capability information for contiguous intra-band carrier aggregation and/or non-contiguous intra-band carrier aggregation. In another example embodiment, a wireless device may also communicate wireless device inter-band carrier group capability to the base station.

According to some of the various aspects of embodiments, a wireless device may indicate its multiple carrier group capability in different information elements for inter-band and intra-band multiple carrier group capability. Each information element may have its own format. In an example embodiment, multiple carrier group capability for intra-band and/or inter-band may be communicated employing at least one parameter and may comprise an index, for example, a band combination index, a configuration index, a band-type index, a combination of the above, and/or the like. The base station may employ an internally stored look-up table to interpret the index. Wireless device may transmit at least one parameter including the index to the base station. The base station may use a set of pre-stored configuration options (for example in a look-up table, information list, a stored file, and/or the like format). The base station may receive the index and determine some of the multiple carrier groups capabilities according to the index. For example, an index three may indicate a multiple carrier group capability supporting band A and band B. In another example, an index four may indicate a multiple carrier group capability of a pre-define intra-band configuration. These configurations are for example only and other examples employing configuration index may be possible. The indexing may reduce the number bits employed for transmitting multiple carrier group capability to the base station.

In an example embodiment, a wireless device may indicate its multiple carrier group capability in an information elements for inter-band and intra-band multiple carrier group capability. All the possible inter-band and intra-band combinations may be transmitted in the same information element field and a base station may detect wireless device inter-band and intra-band capability employing the received information element, for example, in a wireless device capability message. In an implementation option, an index may be employed to indicate both inter-band and intra-band configuration options.

According to some of the various aspects of embodiments, a base station may receive (explicitly or implicitly) information about whether a wireless device supports multiple carrier group capability using network signaling on an interface to the core network (for example the interface to mobility management entity). This information may be received from a mobility management entity during the RRC connection signaling. Some of the multiple carrier groups options may be considered supported by default or may be considered supported based on some other capability parameters. For example, any wireless device supporting inter-band carriers and supporting multiple carrier groups feature may be assumed that is supporting inter-band multiple time alignments. Or for example, intra-band time alignment may be considered a default feature of the wireless device supporting multiple carrier groups feature. In another example, support for intra-band time alignment may need to be explicitly reported to base station by the wireless device.

In an example embodiment, both inter-band and intra-band carrier aggregation may support multiple carrier groups configurations. For example, carriers in the same carrier group may be in the same or different bands. In another example, carriers in the same band may belong to same or different carrier groups. In an example embodiment, carrier group configuration may not be band-specific and may work with the current wireless device working band combination. In another example, a wireless device may report its multiple carrier group capability based on supported band combinations. Support for multiple carrier group configurations may imply that one or more of the following features are supported by the wireless device: i) Parallel transmission of a preamble on a second carrier uplink carrier (second carrier PRACH) and PUSCH on at least one other carrier; ii) Parallel transmission of a preamble on second carrier uplink carrier (second carrier PRACH) and PUCCH on at least one other carrier, for example the first carrier; iii) Parallel transmission of preamble on second carrier uplink carrier, PUCCH (for example on first carrier), and PUSCH on at least one other carrier. This feature may be supported if parallel transmission of PUCCH and PUSCH is supported by the wireless device; iv) Processing MAC time alignment CE commands including carrier group index. The wireless device may apply the time alignment value to the proper carrier group according to carrier group index in the MAC time alignment CE; v) Running random access process on a second carrier belong to a second carrier group. This feature may require transmission of random access preamble on an uplink carrier belonging to a second carrier of a second carrier group; vi) Maintaining more than one time alignment timer in the wireless device; vii) Grouping carriers into multiple carrier groups, wherein a carrier group timing is managed based, at least in part, on a different timing reference second carrier and time alignments associated with a carrier group. A wireless device may need to synchronize and track synchronization signals of multiple downlink carriers, one reference carrier synchronization signal for a carrier group. A carrier group may have its own timing reference second carrier, which is different than the timing reference carrier of another carrier group.

In an example embodiment, a wireless device supporting multiple carrier groups feature may support one or more of the above features. For example, the supported feature may be based, at least in part, on the parameters of the wireless device capability message and other predetermined parameters (explicitly or implicitly determined by signaling messages or technology specifications) and/or other signaling messages. In an example embodiment, a wireless device supporting multiple carrier groups feature may support all the features itemized above. A wireless device that does not support multiple carrier groups feature may support none of the above features. In another example embodiment, a wireless device supporting multiple carrier groups feature may support all the above features. A wireless device that does not support multiple carrier groups feature may not support all-of-the-above features.

Figure 7:
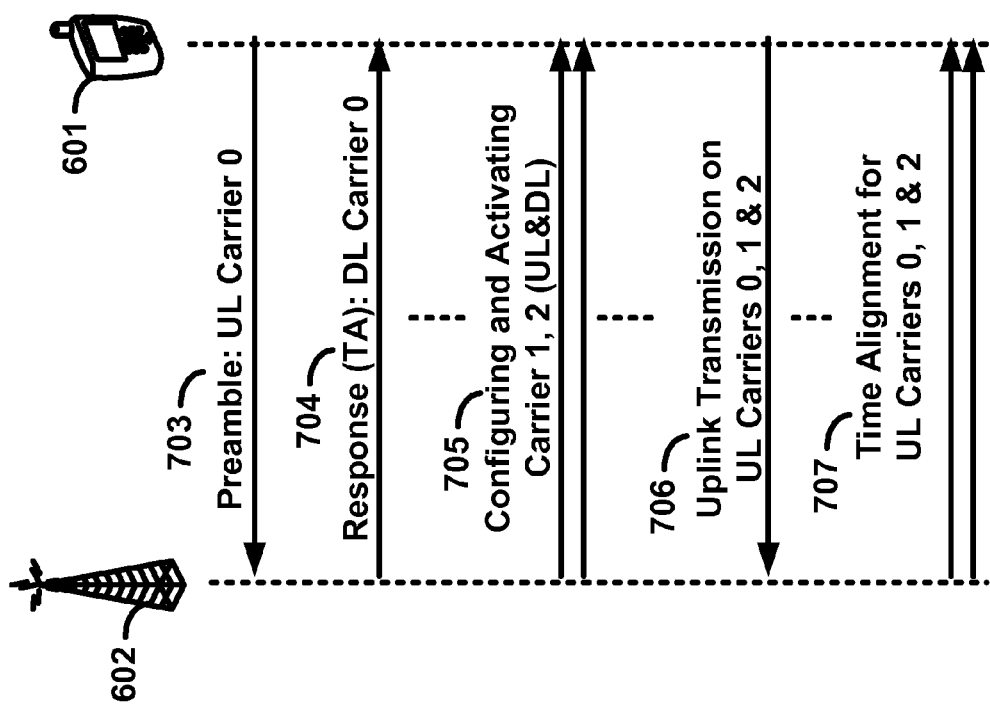
FIG. 7 depicts message flows between a base station and a wireless device as per an aspect of an embodiment of the present invention.
Figure 8:
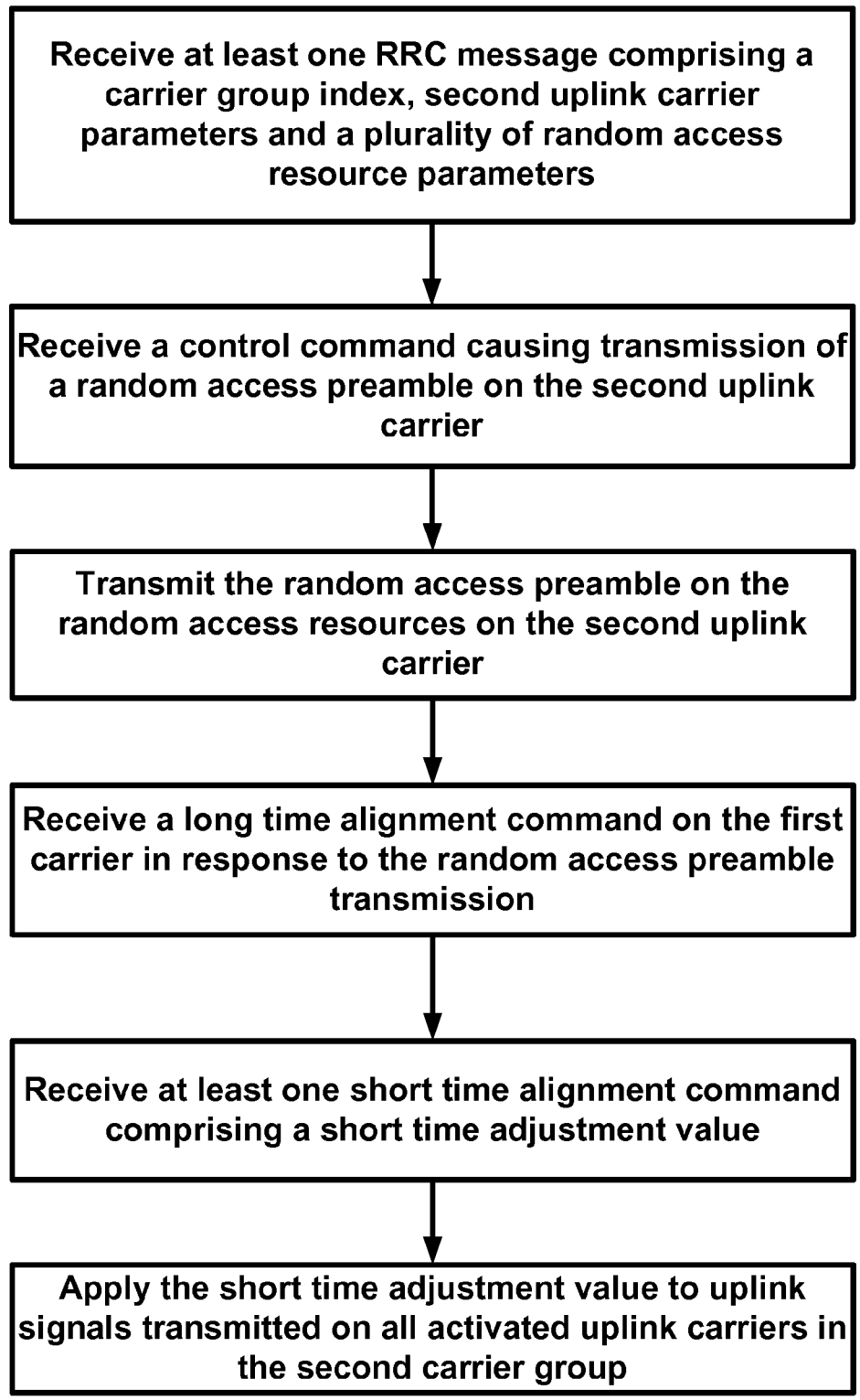
FIG. 8 depicts an example flow chart for a time alignment process in a wireless device as per an aspect of an embodiment of the present invention.
Figure 9:
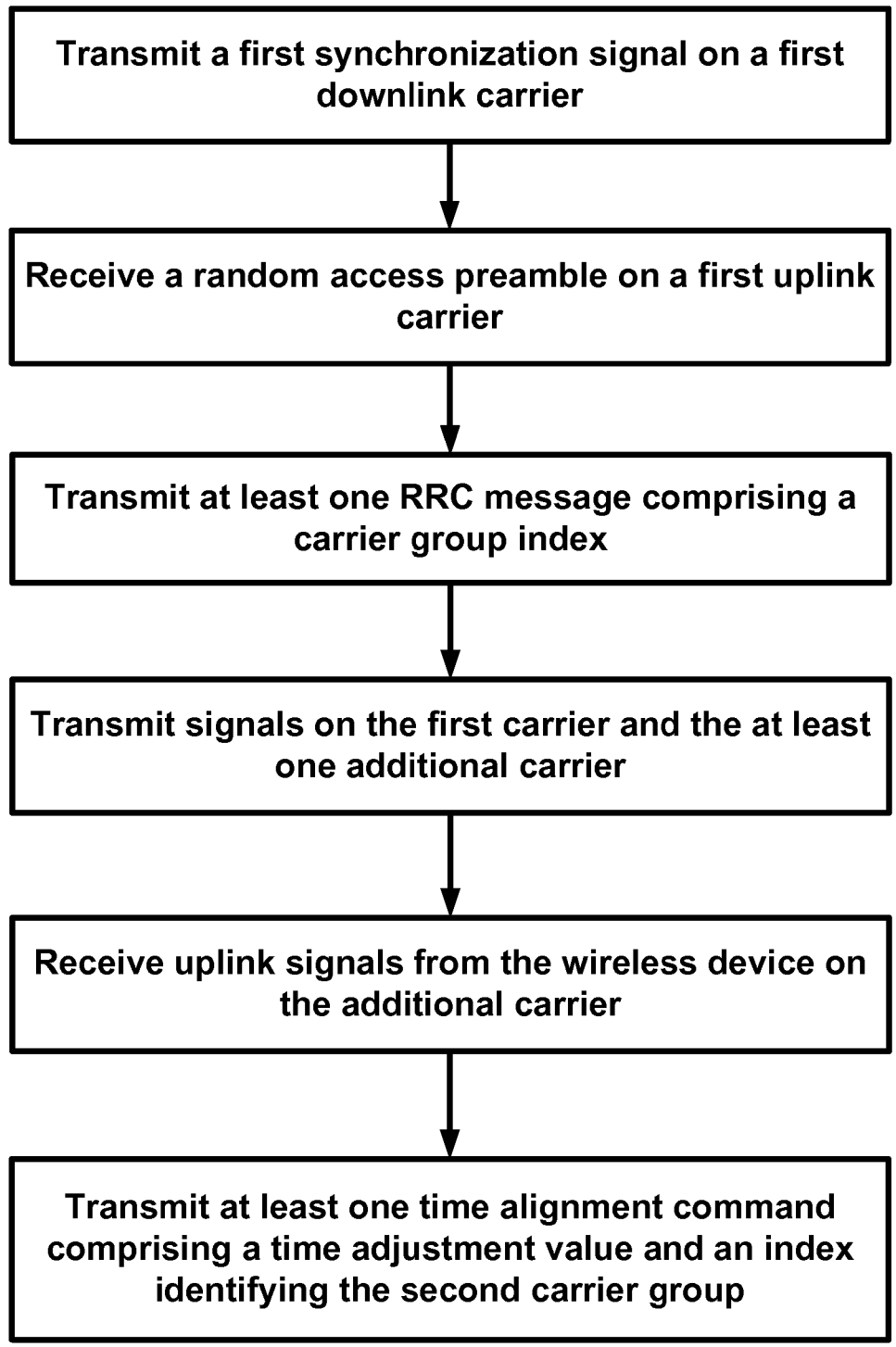
FIG. 9 depicts an example flow chart for a time alignment process in a base station as per an aspect of an embodiment of the present invention.

According to some of the various aspects of embodiments, the base station may transmit a synchronization signal on a first downlink carrier via the communication interface. The synchronization signal may indicate a physical cell ID for the first carrier. The synchronization signal may provide timing information for the first downlink carrier. In an example embodiment, the synchronization signal may be a signal with a pre-defined structure that is transmitted at a predefined time and subcarriers. FIG. 7 depicts message flows between a base station 602 and a wireless device 601 as per an aspect of an embodiment of the present invention. The base station 602 may receive a random access preamble 703 on a second plurality of subcarriers from the wireless device 601 on a first uplink carrier in the plurality of uplink carriers. The first uplink carrier corresponds to the first downlink carrier. The timing of the random access preamble is determined based, at least in part, on the synchronization signal timing and many other parameters including parameters received from the base station by the wireless device. The base station 602 may transmit a long time alignment command 704 in a random access response to the wireless device 601 on a third plurality of subcarriers on the first downlink carrier. The long time alignment command may indicate an amount of required time adjustment for signal transmission on the first uplink carrier.

The base station may transmit at least one configuration message 705 to the wireless device. The at least one configuration message is configured to configure at least one additional carrier in the wireless device. An additional carrier in the at least one additional carrier may comprise an additional downlink carrier and zero or one additional uplink carrier. The base station may also configure carrier groups comprising a first carrier group and a second carrier group. The first carrier group includes the first carrier and zero or more additional carrier. The second carrier group includes at least one of the at least one additional carrier. The base station may also transmit an activation command 705 to the wireless device. The activation command may be configured to activate in the wireless device at least one of at least one additional carrier.

The base station 602 may transmit a control command to the wireless device 601 for transmission of a random access preamble on one of the additional uplink carriers of the second carrier group. The base station may transmit a random access response containing a long time alignment command in response to reception of said random access preamble. The base station may transmit signals to the wireless device on the first downlink carrier and at least one additional downlink carrier. The signals may carry control packets or data packets, or may be physical layer signals. Frame and subframe transmission timing of the first downlink carrier and the at least one additional downlink carrier may be substantially synchronized. Base station 602 may receive signals 706 from the wireless device 601 on the first uplink carrier and the at least one additional uplink carrier. The received signals 706 may carry control or data packets, or may be physical layer signals. The base station 602 may transmit at least one short time alignment command 707 to the wireless device 601. The short time alignment command comprises at least one short time alignment entity. Each short time alignment entity may comprise: a) an amount of time adjustment, and b) an index identifying a carrier group. Long time alignment commands are contained in random access responses. Short time alignment commands are contained in MAC time alignment command control elements.

Figure 6:
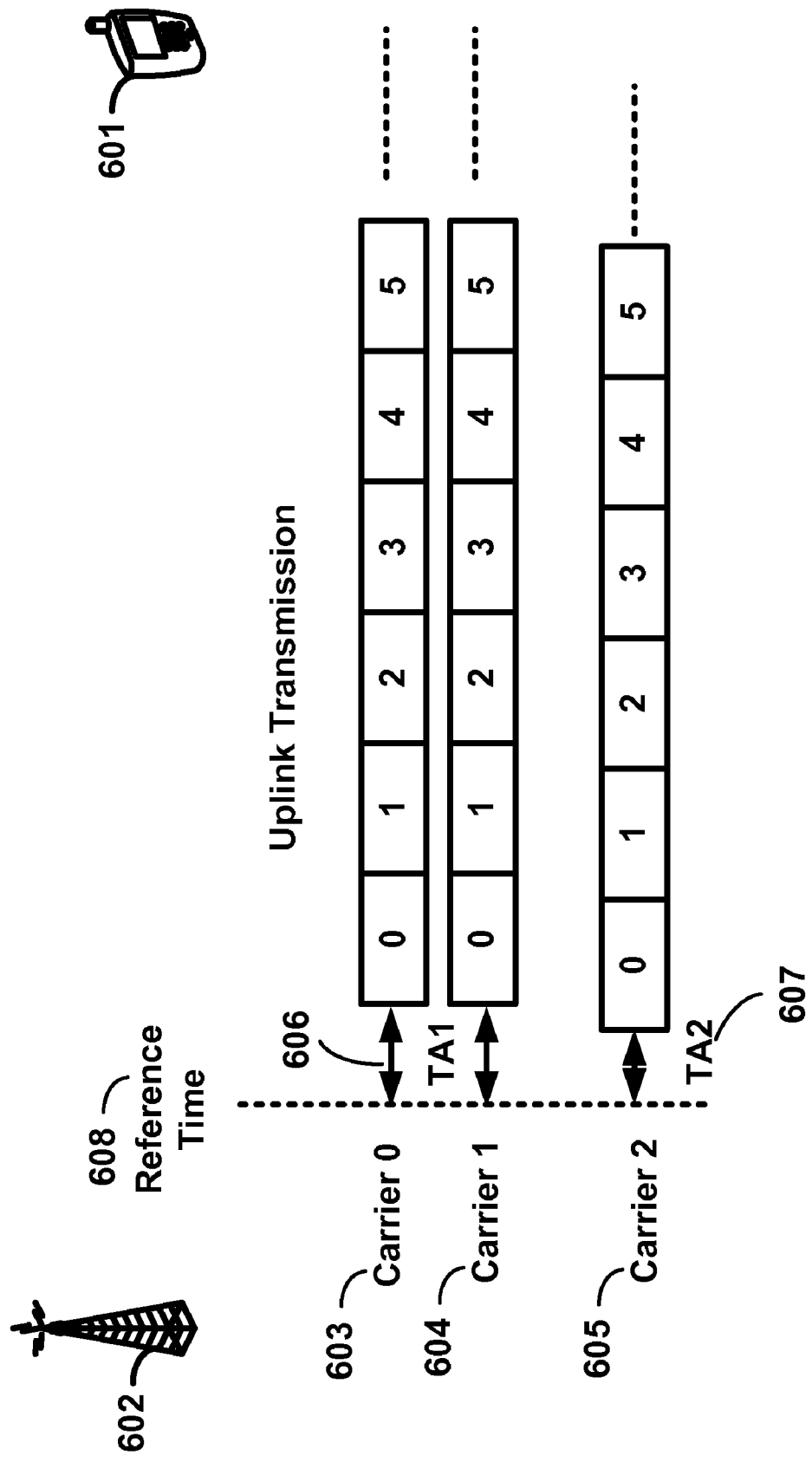
FIG. 6 illustrates the subframe timing as per an aspect of an embodiment of the present invention.

FIG. 6 illustrates the subframe timing as per an aspect of an embodiment of the present invention. The subframe signals of carrier zero 603, carrier one 604 and carrier two 605 are transmitted by the wireless device 601. Carriers are divided into two groups. The first group includes carrier 0 and carrier 1, and the second group includes carrier 2. The signals of a carrier may experience a different transmission delay compared to another carrier. In an example, the signals received from carrier zero 603 and carrier one 604 require TA1 606, and the signals received from carrier two 605 requires TA2 607 in order to be aligned with the reference time 608 at the base station 602. Base station 602 transmits time alignment commands to the wireless device. The time alignment commands are configured to cause adjustment of carrier(s) transmission time. The time alignment value for different carrier groups may be different. Upon reception of the commands by the wireless device 601, the wireless device 601 may adjust uplink carrier signal timings of the corresponding carrier group accordingly. Then the received signals at the base station 602 may become substantially synchronized with the signals received from other wireless devices (not shown in the FIG. 6). In this example, signal reception time of carrier zero 603, carrier one 604 and carrier two 605 are to be substantially synchronized at the base station 602.

According to some of the various aspects of embodiments, the primary synchronization signal may be generated employing a frequency-domain Zadoff-Chu sequence. The primary synchronization signal may be mapped to the last OFDM symbol in slots 0 and 10 for FDD frame structure. The primary synchronization signal may be mapped to the third OFDM symbol in subframes 1 and 6 for TDD frame structure. The secondary synchronization signal may be generated employing an interleaved concatenation of two length-31 binary sequences. The concatenated sequence may be scrambled with a scrambling sequence given by the primary synchronization signal. The secondary synchronization signal may differ between subframe 0 and subframe 5. The timing information provided by synchronization signal may comprise subframe timing and frame timing.

The base station may transmit a control command, for example in the form of a PDCCH order, to the wireless device initiating transmission of the random access preamble by the wireless device. In the first carrier group, the transmission of the random access preamble on the first carrier may be initiated by the MAC sub-layer in the wireless device. The base station may transmit random access parameters to the wireless device. The parameters may be employed for generating a random access preamble by the wireless device. The parameters may also be employed for determining a transmission time for the random access preamble by the wireless device. The long time alignment command transmitted by the base station may be included in a random access response message. The configuring task of the at least one additional carrier may comprise configuring at least one of a physical layer parameter, a MAC layer parameter and an RLC layer parameter. The activating task of a carrier in the at least one additional carrier in the wireless device may comprise processing the received signal of the carrier by the wireless device. The activating task may also comprise the wireless device potentially transmitting packets/signals employing the carrier. There may be at least a guard band between two carriers.

According to some of the various aspects of embodiments, the random access procedure may be initiated by a physical downlink control channel (PDCCH) order or by the MAC sublayer in the wireless device. If a wireless device receives a PDCCH message consistent with a PDCCH order masked with its radio identifier, it may initiate a random access procedure. Preamble transmission on physical random access channel (PRACH) may be supported on the uplink carrier and reception of a PDCCH order may be supported on the downlink carrier. Before the wireless device initiates transmission of a random access preamble, it may access one or many of the following information: a) the available set of PRACH resources for the transmission of the random access preamble, b) the groups of random access preambles and the set of available random access preambles in each group, c) the random access response window size, d) the power-ramping factor, e) the maximum number of preamble transmissions, f) the initial preamble power, g) the preamble format based offset, h) the contention resolution timer, and/or the like. These parameters may be updated from upper layers or may be received from the base station before a random access procedure is initiated.

The wireless device may select a random access preamble using the available information. The preamble may be signaled by the base station or it may be randomly selected by the wireless device. The wireless device may determine the next available subframe containing PRACH permitted by the restrictions given by the base station and physical layer timing requirements for TDD or FDD. Subframe timing and the timing of transmitting the random access preamble may be determined based on the synchronization signals received from the base station and the information received from the base station. The wireless device may proceed to the transmission of the random access preamble when it has determined the timing. The random access preamble is transmitted on a second plurality of subcarriers on the first uplink carrier.

Once the random access preamble is transmitted, the wireless device may monitor the PDCCH of the first downlink carrier for random access response(s) identified by the RA-RNTI during the random access response window. RA-RNTI is the identifier in PDCCH that identifies a random access response. The wireless device may stop monitoring for random access response(s) after successful reception of a random access response containing a random access preamble identifier that matches the transmitted random access preamble. Base station random access response may include a long time alignment command. The wireless device may process the received long time alignment command and adjust its uplink transmission timing according the time alignment value in the command. For example, in a random access response, long time alignment command may be coded using 11 bits, where an amount of the time alignment is based on the value in command. When an uplink transmission is required, the base station may provide the wireless device a grant for uplink transmission.

If no random access response is received within the random access response window, or if none of all received random access responses contains a random access preamble identifier corresponding to the transmitted random access preamble, the random access response reception may be considered not successful and the wireless device may, based on the backoff parameter in the wireless device, select a random backoff time. The wireless device may delay the subsequent random access transmission by the backoff time, and may retransmit another random access preamble. The wireless device may transmit packets on the first uplink carrier and the at least one additional uplink carrier. Uplink packet transmission timing for a carrier group may be obtained in the wireless device employing, at least in part, timing of a synchronization signals received in a downlink carrier of the carrier group. Upon reception of a timing alignment command by the wireless device, the wireless device may adjust the uplink transmission timing of the corresponding carrier group. The timing alignment command may indicate the change of the uplink timing relative to the current uplink timing of the carrier group. Adjustment of the uplink timing by a positive or a negative amount indicates advancing or delaying the uplink transmission timing by a given amount respectively.

According to some of the various aspects of embodiments, the wireless device may receive at least one control message from a base station. The at least one control message may configure a plurality of carriers and a plurality of carrier groups. Each carrier group may comprise at least one downlink carrier and at least one uplink carrier. The uplink carriers in a carrier group may employ the same timing reference. The wireless device may receive an activation command from the base station. The activation command may activate at least one carrier of a carrier group in the plurality of carrier groups. The wireless device may receive a control command from the base station. The control command may direct the wireless device to initiate random access procedure on an uplink carrier of a carrier group. The wireless device may obtain initial uplink timing alignment for the carrier group, through the initiated random access procedure.

The wireless device may transmit data on a subset of subframes in the plurality of subframes on a subset of at least one uplink carrier in the carrier group. The random access procedure may be a non-contention based random access procedure. The at least one control message may be at least one unicast RRC control message and may comprise at least one of: a) a plurality of carrier group identifiers, and b) a carrier index associated to configured carriers. Each carrier may be associated with a carrier group identifier in the plurality of carrier group identifiers. The activation command may be a MAC activation command received from a serving base station. The activation command may activate at least one carrier of a carrier group in the plurality of carrier groups. The MAC activation command may comprise the carrier index of the carries to be activated. The control command may be a PDCCH control message from the base station. The PDCCH control message may direct the wireless device to initiate random access procedure on an uplink carrier of the carrier group. The PDCCH message may comprise a preamble index.

The wireless device may initiate a random access procedure by transmitting a random access preamble corresponding to the preamble index. The random access preamble may be transmitted in a plurality of random access resources configured by the base station. The wireless device may obtain initial uplink timing alignment for the carrier group, through the initiated random access procedure. The wireless device may transmit data on a subset of subframes in the plurality of subframes on a subset of at least one uplink carrier in the carrier group. The random access procedure may be a non-contention based random access procedure. The wireless device may maintain a separate timing alignment timer for each carrier group in the plurality of carrier groups.

The PDCCH control message may be received on the scheduling downlink carrier of the uplink carrier. Multiple random access preambles may be transmitted in a plurality of random access resources in the same subframe by various wireless devices. The at least one unicast RRC control message may further comprise the configuration of the random access resources. Uplink timing reference for the carrier group may be maintained, at least in part, using MAC time alignment messages. The PDCCH message may further include a carrier index. The PDCCH message may further include a power control command. PDCCH message may be scrambled using an identifier of the wireless device.

Serving carriers having uplink to which the same time alignment applies may be grouped in a time alignment group or a carrier group. Each carrier group may include at least one downlink carrier with at least one configured uplink carrier. The mapping of each downlink carrier to a carrier group may be configured by the serving base station employing RRC message(s). Time alignment maintenance for the carrier group containing the primary carrier may follow the release 8, 9 or 10 of LTE standard for time alignment maintenance. To obtain initial uplink time alignment for a secondary downlink carrier not grouped together with the primary downlink carrier, base station may initiate a random access procedure. The number of time alignment timer to be maintained may be one per carrier group. Time alignment timers may be configured by the base station. The random access procedure on secondary carriers may be initiated by the base station. The base station may initiate the random access procedure via a control message (for example a PDCCH order) for an activated secondary carrier. Non-contention based random access procedure may be supported. Cross-carrier scheduling may take place in the random access procedure for transmission of PDCCH order.

According to some of the various aspects of embodiments, a wireless device may receive at least one RRC control message from a base station. The at least one RRC control message may cause configuration of a plurality of carriers comprising a first carrier and at least one second carrier. The configuration may associate with a second carrier in the at least one second carrier: a carrier group index, a second uplink carrier, a plurality of random access resource parameters, and/or the like. The carrier group index may identify a second carrier group. The second carrier group may be one of a plurality of carrier groups. The second carrier group may comprise a second subset of the at least one second carrier. The plurality of random access resource parameters may identify random access resources.

The wireless device may receive from the base station, a control command. The control command may cause the wireless device to transmit a random access preamble on the second uplink carrier. The control command may comprise a preamble index corresponding to the random access preamble. The wireless device may transmit the random access preamble on the random access resources on the second uplink carrier. Transmission timing of the random access preamble may be determined, at least in part, by employing a synchronization signal transmitted on one of at least one downlink carrier in the second carrier group. Uplink transmissions in the second carrier group may employ the synchronization signal as timing reference.

The wireless device may receive a long time alignment command on the first carrier in response to the random access preamble transmission. The long time alignment command may comprise the preamble index and a long time adjustment value. The wireless device may receive at least one short time alignment command from the base station. The short time alignment command may comprise a short time adjustment value and an index. The short time adjustment value range may be substantially smaller than the long time adjustment value range. The index may identify the second carrier group. The wireless device may apply the time adjustment value to uplink signals transmitted on all activated uplink carriers in the second carrier group. The wireless device may apply the time adjustment value such that the base station receives substantially aligned uplink signals in frames and subframes of the second carrier group.

According to some of the various aspects of embodiments, the long time alignment command may not comprise an index identifying the second carrier group. The long time alignment command may comprise a preamble index. The short time alignment command may not comprise a preamble index. The short time alignment command may comprise an index identifying the second carrier group. The plurality of carrier groups may further comprise a first carrier group comprising a first subset of the plurality of carriers. The first subset may comprise the first carrier with a first downlink carrier and a first uplink carrier. Uplink transmissions by the wireless device in the first carrier group may employ a first synchronization signal transmitted on the first downlink carrier as timing reference.

Transmission of the control command may be initiated by a MAC sub-layer in the base station. The wireless device may receive random access parameters from the base station. The parameters may be configured to be employed in the generation of the random access preamble by the wireless device. The random access parameters may be configured to be employed in the determination of the random access preamble transmission time.

The long time alignment command may be received in a random access response message. In an example embodiment, the long time adjustment value may be encoded employing 11 bits. The short time alignment value may be encoded employing 6 bits.

The wireless device may receive an activation command from the base station prior to receiving the control command. The activation command causing activation of the second carrier in the wireless device, the activation causing the wireless device to process downlink received signals on the second carrier.

According to some of the various aspects of embodiments, a base station may transmit a first synchronization signal on a first downlink carrier of a first carrier in a plurality of carriers. The base station may receive a random access preamble on a first uplink carrier of the first carrier. The timing of the random access preamble transmission may be determined based, at least in part, on the first synchronization signal timing. The base station may transmit at least one RRC control message. The at least one RRC control message may cause configuration of at least one additional carrier in the wireless device. The configuration may associate with an additional carrier in the at least one additional carrier a carrier group index identifying a second carrier group. The second carrier group may be one of a plurality of carrier groups. The second carrier group may comprise a subset of the at least one additional carrier.

The base station may transmit, to the wireless device, signals on the first carrier and the at least one additional carrier. Downlink frames and subframes transmission timing for the first carrier and the at least one additional carrier may be substantially time aligned with each other. The base station may receive uplink signals from the wireless device on the additional carrier. The base station may transmit, to the wireless device, at least one time alignment command computed based, at least in part, on timing of the received uplink signals. The time alignment command may comprise a time adjustment value and an index identifying the second carrier group. The at least one time alignment command causes substantial alignment of reception timing of uplink signals in frames and subframes of the second carrier group. Uplink transmission timing of frames and subframes of the first carrier and the additional carrier employ different synchronization signals as timing reference and are adjusted in response to different time alignment commands.

According to some of the various aspects of embodiments, the first synchronization signal comprises a primary synchronization signal and a secondary synchronization signal. The synchronization signal may be configured to: indicate a physical carrier ID for the first carrier; provide transmission timing information for the first downlink carrier; be transmitted employing a first plurality of subcarriers, and/or the like. Transmission time may be divided into a plurality of frames. Each frame in the plurality of frames may further be divided into a plurality of subframes. The first plurality of subcarriers may be substantially in the center of the frequency band of the first downlink carrier on the first and sixth subframe of each frame in the plurality of frames.

The base station may generate the primary synchronization signal employing a frequency-domain Zadoff-Chu sequence. The base station may generate the secondary synchronization signal employing an interleaved concatenation of two 31 bit length binary sequences. The base station may scramble the concatenated sequence with a scrambling sequence given by the primary synchronization signal. The secondary synchronization signal may differ between subframe 0 and subframe 5. The timing information may comprises subframe timing and frame timing. The configuration of the at least one additional carrier may comprise configuring at least one of a physical layer parameter, a MAC layer parameter and an RLC layer parameter.

According to some of the various aspects of embodiments, a base station may transmit at least one RRC control message. The at least one RRC control message may cause configuration of a plurality of carriers comprising a first carrier and at least one additional carrier in the wireless device. The configuration may associate with a carrier in the plurality of carriers a carrier group index identifying a carrier group. The carrier group may be one of a plurality of carrier groups. The plurality of carrier groups may comprise a first carrier group and a second carrier group. The first carrier group may comprise a first subset of the plurality of carriers. The first subset may comprise the first carrier. The second carrier group may comprise a subset of the at least one additional carrier.

The base station may transmit, to the wireless device, signals on the plurality of carriers. Downlink frames and subframes transmission timing for the first carrier and the at least one additional carrier may be substantially time aligned with each other. The base station may receive uplink signals from the wireless device on the plurality of carriers. The base station may transmit, to the wireless device, at least one time alignment command. The time alignment command may comprise a time adjustment value and an index identifying one carrier group. Uplink transmission timing of frames and subframes in the first carrier group and the second carrier group may employ different synchronization signals on different carriers as timing reference and are adjusted in response to different time alignment commands.

According to some of the various aspects of embodiments, a base station may receive a plurality of radio capability parameters from the wireless device on the first carrier. The plurality of radio capability parameters may comprise at least one parameter indicating whether the wireless device supports configuration of a plurality of carrier groups. If the plurality of radio capability parameters may indicate that the wireless device supports configuration of a plurality of carrier groups, the base station may, selectively based on at least one criterion, transmit the at least one RRC control message to cause configuration of the plurality of carrier groups in the wireless device. Uplink transmissions by the wireless device in the first carrier group may employs a first synchronization signal transmitted on a first downlink carrier of the first carrier as a timing reference. Uplink transmissions by the wireless device in the second carrier group may employ a second synchronization signal transmitted on one of at least one downlink carrier in the second carrier group.

According to some of the various aspects of embodiments, a wireless device may receive at least one RRC control message from a base station. The at least one RRC control message may cause configuration of a plurality of carriers comprising a first carrier and at least one second carrier. The configuration may associate with a second carrier in the at least one second carrier: a carrier group index, a second uplink carrier, a plurality of random access resource parameters, and/or the like. The carrier group index may identify a second carrier group. The second carrier group may be one of a plurality of carrier groups. The second carrier group may comprise a second subset of the at least one second carrier. The plurality of random access resource parameters may identify random access resources.

The wireless device may receive from the base station, a control command. The control command may cause the wireless device to transmit a random access preamble on the second uplink carrier. The control command may comprise a preamble index corresponding to the random access preamble. The wireless device may transmit the random access preamble on the random access resources on the second uplink carrier. Transmission timing of the random access preamble may be determined, at least in part, by employing a synchronization signal transmitted on one of at least one downlink carrier in the second carrier group. Uplink transmissions in the second carrier group may employ the synchronization signal as timing reference.

The wireless device may receive a long time alignment command on the first carrier in response to the random access preamble transmission. The long time alignment command may comprise the preamble index and a long time adjustment value. The wireless device may receive at least one short time alignment command from the base station. The short time alignment command may comprise a short time adjustment value and an index. The short time adjustment value range may be substantially smaller than the long time adjustment value range. The index may identify the second carrier group. The wireless device may apply the time adjustment value to uplink signals transmitted on all activated uplink carriers in the second carrier group. The wireless device may apply the time adjustment value such that the base station receives substantially aligned uplink signals in frames and subframes of the second carrier group.

According to some of the various aspects of embodiments, the long time alignment command may not comprise an index identifying the second carrier group. The long time alignment command may comprise a preamble index. The short time alignment command may not comprise a preamble index. The short time alignment command may comprise an index identifying the second carrier group. The plurality of carrier groups may further comprise a first carrier group comprising a first subset of the plurality of carriers. The first subset may comprise the first carrier with a first downlink carrier and a first uplink carrier. Uplink transmissions by the wireless device in the first carrier group may employ a first synchronization signal transmitted on the first downlink carrier as timing reference.

Transmission of the control command may be initiated by a MAC sub-layer in the base station. The wireless device may receive random access parameters from the base station. The parameters may be configured to be employed in the generation of the random access preamble by the wireless device. The random access parameters may be configured to be employed in the determination of the random access preamble transmission time.

The long time alignment command may be received in a random access response message. In an example embodiment, the long time adjustment value may be encoded employing 11 bits. The short time alignment value may be encoded employing 6 bits.

The wireless device may receive an activation command from the base station prior to receiving the control command. The activation command causing activation of the second carrier in the wireless device, the activation causing the wireless device to process downlink received signals on the second carrier.

According to some of the various aspects of embodiments, a base station may transmit a first synchronization signal on a first downlink carrier of a first carrier in a plurality of carriers. The base station may receive a random access preamble on a first uplink carrier of the first carrier. The timing of the random access preamble transmission may be determined based, at least in part, on the first synchronization signal timing. The base station may transmit at least one RRC control message. The at least one RRC control message may cause configuration of at least one additional carrier in the wireless device. The configuration may associate with an additional carrier in the at least one additional carrier a carrier group index identifying a second carrier group. The second carrier group may be one of a plurality of carrier groups. The second carrier group may comprise a subset of the at least one additional carrier.

The base station may transmit, to the wireless device, signals on the first carrier and the at least one additional carrier. Downlink frames and subframes transmission timing for the first carrier and the at least one additional carrier may be substantially time aligned with each other. The base station may receive uplink signals from the wireless device on the additional carrier. The base station may transmit, to the wireless device, at least one time alignment command computed based, at least in part, on timing of the received uplink signals. The time alignment command may comprise a time adjustment value and an index identifying the second carrier group. The at least one time alignment command causes substantial alignment of reception timing of uplink signals in frames and subframes of the second carrier group. Uplink transmission timing of frames and subframes of the first carrier and the additional carrier employ different synchronization signals as timing reference and are adjusted in response to different time alignment commands.

According to some of the various aspects of embodiments, the first synchronization signal comprises a primary synchronization signal and a secondary synchronization signal. The synchronization signal may be configured to: indicate a physical carrier ID for the first carrier; provide transmission timing information for the first downlink carrier; be transmitted employing a first plurality of subcarriers, and/or the like. Transmission time may be divided into a plurality of frames. Each frame in the plurality of frames may further be divided into a plurality of subframes. The first plurality of subcarriers may be substantially in the center of the frequency band of the first downlink carrier on the first and sixth subframe of each frame in the plurality of frames.

The base station may generate the primary synchronization signal employing a frequency-domain Zadoff-Chu sequence. The base station may generate the secondary synchronization signal employing an interleaved concatenation of two 31 bit length binary sequences. The base station may scramble the concatenated sequence with a scrambling sequence given by the primary synchronization signal. The secondary synchronization signal may differ between subframe 0 and subframe 5. The timing information may comprises subframe timing and frame timing. The configuration of the at least one additional carrier may comprise configuring at least one of a physical layer parameter, a MAC layer parameter and an RLC layer parameter.

According to some of the various aspects of embodiments, a base station may transmit at least one RRC control message. The at least one RRC control message may cause configuration of a plurality of carriers comprising a first carrier and at least one additional carrier in the wireless device. The configuration may associate with a carrier in the plurality of carriers a carrier group index identifying a carrier group. The carrier group may be one of a plurality of carrier groups. The plurality of carrier groups may comprise a first carrier group and a second carrier group. The first carrier group may comprise a first subset of the plurality of carriers. The first subset may comprise the first carrier. The second carrier group may comprise a subset of the at least one additional carrier.

The base station may transmit, to the wireless device, signals on the plurality of carriers. Downlink frames and subframes transmission timing for the first carrier and the at least one additional carrier may be substantially time aligned with each other. The base station may receive uplink signals from the wireless device on the plurality of carriers. The base station may transmit, to the wireless device, at least one time alignment command. The time alignment command may comprise a time adjustment value and an index identifying one carrier group. Uplink transmission timing of frames and subframes in the first carrier group and the second carrier group may employ different synchronization signals on different carriers as timing reference and are adjusted in response to different time alignment commands.

According to some of the various aspects of embodiments, a base station may receive a plurality of radio capability parameters from the wireless device on the first carrier. The plurality of radio capability parameters may comprise at least one parameter indicating whether the wireless device supports configuration of a plurality of carrier groups. If the plurality of radio capability parameters may indicate that the wireless device supports configuration of a plurality of carrier groups, the base station may, selectively based on at least one criterion, transmit the at least one RRC control message to cause configuration of the plurality of carrier groups in the wireless device. Uplink transmissions by the wireless device in the first carrier group may employs a first synchronization signal transmitted on a first downlink carrier of the first carrier as a timing reference. Uplink transmissions by the wireless device in the second carrier group may employ a second synchronization signal transmitted on one of at least one downlink carrier in the second carrier group.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols.

According to some of the various aspects of embodiments, cell search may be the procedure by which a wireless device may acquire time and frequency synchronization with a cell and may detect the physical layer Cell ID of that cell (transmitter). An example embodiment for synchronization signal and cell search is presented below. A cell search may support a scalable overall transmission bandwidth corresponding to 6 resource blocks and upwards. Primary and secondary synchronization signals may be transmitted in the downlink and may facilitate cell search. For example, 504 unique physical-layer cell identities may be defined using synchronization signals. The physical-layer cell identities may be grouped into 168 unique physical-layer cell-identity groups, group(s) containing three unique identities. The grouping may be such that physical-layer cell identit(ies) is part of a physical-layer cell-identity group. A physical-layer cell identity may be defined by a number in the range of 0 to 167, representing the physical-layer cell-identity group, and a number in the range of 0 to 2, representing the physical-layer identity within the physical-layer cell-identity group. The synchronization signal may include a primary synchronization signal and a secondary synchronization signal.

According to some of the various aspects of embodiments, the sequence used for a primary synchronization signal may be generated from a frequency-domain Zadoff-Chu sequence according to a pre-defined formula. A Zadoff-Chu root sequence index may also be predefined in a specification. The mapping of the sequence to resource elements may depend on a frame structure. The wireless device may not assume that the primary synchronization signal is transmitted on the same antenna port as any of the downlink reference signals. The wireless device may not assume that any transmission instance of the primary synchronization signal is transmitted on the same antenna port, or ports, used for any other transmission instance of the primary synchronization signal. The sequence may be mapped to the resource elements according to a predefined formula.

For FDD frame structure, a primary synchronization signal may be mapped to the last OFDM symbol in slots 0 and 10. For TDD frame structure, the primary synchronization signal may be mapped to the third OFDM symbol in subframes 1 and 6. Some of the resource elements allocated to primary or secondary synchronization signals may be reserved and not used for transmission of the primary synchronization signal.

According to some of the various aspects of embodiments, the sequence used for a secondary synchronization signal may be an interleaved concatenation of two length-31 binary sequences. The concatenated sequence may be scrambled with a scrambling sequence given by a primary synchronization signal. The combination of two length-31 sequences defining the secondary synchronization signal may differ between subframe 0 and subframe 5 according to predefined formula(s). The mapping of the sequence to resource elements may depend on the frame structure. In a subframe for FDD frame structure and in a half-frame for TDD frame structure, the same antenna port as for the primary synchronization signal may be used for the secondary synchronization signal. The sequence may be mapped to resource elements according to a predefined formula.

According to some of the various aspects of embodiments, the physical layer random access preamble may comprise a cyclic prefix of length Tcp and a sequence part of length Tseq. The parameter values may be pre-defined and depend on the frame structure and a random access configuration. In an example embodiment, Tcp may be 0.1 msec, and Tseq may be 0.9 msec. Higher layers may control the preamble format. The transmission of a random access preamble, if triggered by the MAC layer, may be restricted to certain time and frequency resources. The start of a random access preamble may be aligned with the start of the corresponding uplink subframe at a wireless device.

According to an example embodiment, random access preambles may be generated from Zadoff-Chu sequences with a zero correlation zone, generated from one or several root Zadoff-Chu sequences. In another example embodiment, the preambles may also be generated using other random sequences such as Gold sequences. The network may configure the set of preamble sequences a wireless device may be allowed to use. According to some of the various aspects of embodiments, there may be a multitude of preambles (e.g. 64) available in cell(s). From the physical layer perspective, the physical layer random access procedure may include the transmission of random access preamble(s) and random access response(s).

Remaining message(s) may be scheduled for transmission by a higher layer on the shared data channel and may not be considered part of the physical layer random access procedure. For example, a random access channel may occupy 6 resource blocks in a subframe or set of consecutive subframes reserved for random access preamble transmissions.

According to some of the various embodiments, the following actions may be followed for a physical random access procedure: 1) layer 1 procedure may be triggered upon request of a preamble transmission by higher layers; 2) a preamble index, a target preamble received power, a corresponding RA-RNTI (random access-radio network temporary identifier) and/or a PRACH resource may be indicated by higher layers as part of a request; 3) a preamble transmission power P_PRACH may be determined; 4) a preamble sequence may be selected from the preamble sequence set using the preamble index; 5) a single preamble may be transmitted using selected preamble sequence(s) with transmission power P_PRACH on the indicated PRACH resource; 6) detection of a PDCCH with the indicated RAR may be attempted during a window controlled by higher layers; and/or the like. If detected, the corresponding downlink shared channel transport block may be passed to higher layers. The higher layers may parse transport block(s) and/or indicate an uplink grant to the physical layer(s).

According to some of the various aspects of embodiments, a random access procedure may be initiated by a physical downlink control channel (PDCCH) order and/or by the MAC sublayer in a wireless device. If a wireless device receives a PDCCH transmission consistent with a PDCCH order masked with its radio identifier, the wireless device may initiate a random access procedure. Preamble transmission(s) on physical random access channel(s) (PRACH) may be supported on a first uplink carrier and reception of a PDCCH order may be supported on a first downlink carrier.

Before a wireless device initiates transmission of a random access preamble, it may access one or many of the following types of information: a) available set(s) of PRACH resources for the transmission of a random access preamble; b) group(s) of random access preambles and set(s) of available random access preambles in group(s); c) random access response window size(s); d) power-ramping factor(s); e) maximum number(s) of preamble transmission(s); f) initial preamble power; g) preamble format based offset(s); h) contention resolution timer(s); and/or the like. These parameters may be updated from upper layers or may be received from the base station before random access procedure(s) may be initiated.

According to some of the various aspects of embodiments, a wireless device may select a random access preamble using available information. The preamble may be signaled by a base station or the preamble may be randomly selected by the wireless device. The wireless device may determine the next available subframe containing PRACH permitted by restrictions given by the base station and the physical layer timing requirements for TDD or FDD. Subframe timing and the timing of transmitting the random access preamble may be determined based, at least in part, on synchronization signals received from the base station and/or the information received from the base station. The wireless device may proceed to the transmission of the random access preamble when it has determined the timing. The random access preamble may be transmitted on a second plurality of subcarriers on the first uplink carrier.

According to some of the various aspects of embodiments, once a random access preamble is transmitted, a wireless device may monitor the PDCCH of a first downlink carrier for random access response(s), in a random access response window. There may be a pre-known identifier in PDCCH that identifies a random access response. The wireless device may stop monitoring for random access response(s) after successful reception of a random access response containing random access preamble identifiers that matches the transmitted random access preamble and/or a random access response address to a wireless device identifier. A base station random access response may include a time alignment command. The wireless device may process the received time alignment command and may adjust its uplink transmission timing according the time alignment value in the command. For example, in a random access response, a time alignment command may be coded using 11 bits, where an amount of the time alignment may be based on the value in the command. In an example embodiment, when an uplink transmission is required, the base station may provide the wireless device a grant for uplink transmission.

If no random access response is received within the random access response window, and/or if none of the received random access responses contains a random access preamble identifier corresponding to the transmitted random access preamble, the random access response reception may be considered unsuccessful and the wireless device may, based on the backoff parameter in the wireless device, select a random backoff time and delay the subsequent random access transmission by the backoff time, and may retransmit another random access preamble.

According to some of the various aspects of embodiments, a wireless device may transmit packets on an uplink carrier. Uplink packet transmission timing may be calculated in the wireless device using the timing of synchronization signal(s) received in a downlink. Upon reception of a timing alignment command by the wireless device, the wireless device may adjust its uplink transmission timing. The timing alignment command may indicate the change of the uplink timing relative to the current uplink timing. The uplink transmission timing for an uplink carrier may be determined using time alignment commands and/or downlink reference signals.

According to some of the various aspects of embodiments, a time alignment command may indicate timing adjustment for transmission of signals on uplink carriers. For example, a time alignment command may use 6 bits. Adjustment of the uplink timing by a positive or a negative amount indicates advancing or delaying the uplink transmission timing by a given amount respectively.

For a timing alignment command received on subframe n, the corresponding adjustment of the timing may be applied with some delay, for example, it may be applied from the beginning of subframe n+6. When the wireless device's uplink transmissions in subframe n and subframe n+1 are overlapped due to the timing adjustment, the wireless device may transmit complete subframe n and may not transmit the overlapped part of subframe n+1.

According to some of the various aspects of embodiments, a wireless device may include a configurable timer (timeAlignmentTimer) that may be used to control how long the wireless device is considered uplink time aligned. When a timing alignment command MAC control element is received, the wireless device may apply the timing alignment command and start or restart timeAlignmentTimer. The wireless device may not perform any uplink transmission except the random access preamble transmission when timeAlignmentTimer is not running or when it exceeds its limit. The time alignment command may substantially align frame and subframe reception timing of a first uplink carrier and at least one additional uplink carrier. According to some of the various aspects of embodiments, the time alignment command value range employed during a random access process may be substantially larger than the time alignment command value range during active data transmission. In an example embodiment, uplink transmission timing may be maintained on a per time alignment group (carrier group) basis. Carrier(s) may be grouped in carrier groups, and carrier groups may have their own downlink timing reference, time alignment timer, and/or time alignment commands. Group(s) may have their own random access process. Time alignment commands may be directed to a time alignment group. The carrier group including the primary cell may be called a primary carrier group and the carrier group not including the primary cell may be called a secondary carrier group.

According to some of the various aspects of embodiments, control message(s) or control packet(s) may be scheduled for transmission in a physical downlink shared channel (PDSCH) and/or physical uplink shared channel PUSCH.

PDSCH and PUSCH may carry control and data message(s)/packet(s). Control message(s) and/or packet(s) may be processed before transmission. For example, the control message(s) and/or packet(s) may be fragmented or multiplexed before transmission. A control message in an upper layer may be processed as a data packet in the MAC or physical layer. For example, system information block(s) as well as data traffic may be scheduled for transmission in PDSCH. Data packet(s) may be encrypted packets.

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6.

Claims that do not expressly include the phrase "means for" or "step for" are not to be interpreted under 35 U.S.C. 112, paragraph 6.

What is claimed is:

1. A method comprising:
    a) receiving, by a wireless device, at least one radio resource control message from a base station, said at least one radio resource control message:
        i) causing configuration of a plurality of carriers comprising a first carrier and at least one second carrier; and
        ii) comprising:
            (1) a carrier group index for a second carrier in said at least one second carrier, said carrier group index identifying a second carrier group, said second carrier group being one of a plurality of carrier groups, said second carrier group comprising a second subset of said at least one second carrier;
            (2) a plurality of second uplink carrier parameters for a second uplink carrier of said second carrier; and
            (3) a plurality of random access resource parameters identifying random access resources for said second carrier;
    b) receiving, by said wireless device from said base station, a control command causing said wireless device to transmit a random access preamble on said second uplink carrier, said control command comprising a preamble index corresponding to said random access preamble;
    c) transmitting, by said wireless device, said random access preamble on said random access resources on said second uplink carrier, transmission timing of said random access preamble being determined, at least in part, by employing a synchronization signal transmitted on one of at least one downlink carrier in said second carrier group, uplink transmissions in said second carrier group employing said synchronization signal as timing reference;
    d) receiving, by said wireless device, a long time alignment command on said first carrier in response to said random access preamble transmission, said long time alignment command comprising said preamble index and a long time adjustment value;

e) receiving, by said wireless device, at least one short time alignment command from said base station, said short time alignment command comprising:
  i) a short time adjustment value, said short time adjustment value range is substantially smaller than said long time adjustment value range; and
  ii) an index identifying said second carrier group; and f) applying, by said wireless device, said short time adjustment value to uplink signals transmitted on all activated uplink carriers in said second carrier group such that said base station receives substantially aligned uplink signals in frames and subframes of said second carrier group.

2. The method of claim 1, wherein:
a) said long time alignment command:
  i) does not comprise an index identifying said second carrier group; and
  ii) comprises a preamble index; and
b) said short time alignment command:
  i) does not comprise a preamble index; and
  ii) comprises an index identifying said second carrier group.

3. The method of claim 1, wherein said plurality of carrier groups further comprising a first carrier group comprising a first subset of said plurality of carriers, said first subset comprising said first carrier with a first downlink carrier and a first uplink carrier, uplink transmissions by said wireless device in said first carrier group employing a first synchronization signal transmitted on said first downlink carrier as timing reference, said first synchronization signal being different than said synchronization signal.

4. The method of claim 1, wherein transmission of said control command is initiated by a media access control sublayer in said base station.

5. The method of claim 1, wherein said plurality of random access resource parameters configured to be employed in the generation of said random access preamble by said wireless device.

6. The method of claim 1, wherein said plurality of random access resource parameters configured to be employed in the determination of transmission time of said random access preamble.

7. The method of claim 1, wherein said long time alignment command is received in a random access response message.

8. The method of claim 1, wherein:
a) said long time adjustment value is encoded employing 11 bits; and
b) said short time adjustment value is encoded employing 6 bits.

9. The method of claim 1, further comprising receiving an activation command from said base station prior to receiving said control command, said activation command causing activation of said second carrier in said wireless device, said activation causing said wireless device to process downlink received signals on said second carrier.

10. A method comprising:
a) transmitting, by a base station, a first synchronization signal on a first downlink carrier of a first carrier in a plurality of carriers;
b) receiving, by said base station from a wireless device, a random access preamble on a first uplink carrier of said first carrier, transmission timing of said random access preamble determined based, at least in part, on said first synchronization signal;
c) transmitting, by said base station, at least one radio resource control message, said at least one radio resource control message:
  (i) causing configuration of at least one additional carrier in said wireless device;
  (ii) comprising a carrier group index for an additional carrier in said at least one additional carrier, said carrier group index identifying a second carrier group, said second carrier group being one of a plurality of carrier groups, said second carrier group comprising a subset of said at least one additional carrier;
d) transmitting, by said base station to said wireless device, signals on said first carrier and said at least one additional carrier, wherein downlink frames and subframes transmission timing for said first carrier and said at least one additional carrier are substantially time aligned with each other;
e) receiving, by said base station, uplink signals from said wireless device on said additional carrier; and
f) transmitting, by said base station to said wireless device, at least one time alignment command computed based, at least in part, on timing of said received uplink signals, said time alignment command comprising:
  i) a time adjustment value; and
  ii) an index identifying said second carrier group; and
wherein said at least one time alignment command causes substantial alignment of reception timing of uplink signals in frames and subframes of said second carrier group; and
wherein uplink transmission timing of frames and subframes of said first carrier and said additional carrier employ different synchronization signals as timing reference and are adjusted in response to different time alignment commands.

11. The method for claim 10, wherein said first synchronization signal comprises a primary synchronization signal and a secondary synchronization signal, said first synchronization signal configured to:
a) indicate a physical carrier ID for said first carrier;
b) provide transmission timing information for said first downlink carrier, transmission time divided into a plurality of frames, each frame in said plurality of frames further divided into a plurality of subframes; and
c) be transmitted employing a first plurality of subcarriers substantially in a center of a frequency band of said first downlink carrier on a first and sixth subframe of each frame in said plurality of frames.

12. The method for claim 11, further comprising generating said primary synchronization signal employing a frequency-domain Zadoff-Chu sequence.

13. The method of claim 11, further comprising generating said secondary synchronization signal employing an interleaved concatenation of two 31 bit length binary sequences.

14. The method of claim 13, further comprising scrambling a concatenated sequence with a scrambling sequence given by said primary synchronization signal.

15. The method of claim 11, wherein said timing information comprises subframe timing and frame timing.

16. The method of claim 10, wherein said configuration of said at least one additional carrier comprises configuring at least one of a physical layer parameter, a media access control layer parameter and a radio link control layer parameter.

17. A method comprising:
a) transmitting, by said base station, at least one radio resource control message, said at least one radio resource control message:

(i) causing configuration of a plurality of carriers comprising a first carrier and at least one additional carrier in said wireless device;
(ii) comprising a carrier group index for a carrier in said plurality of carriers, said carrier group index identifying a carrier group, said carrier group being one of a plurality of carrier groups, said plurality of carrier groups comprising:
(1) a first carrier group comprising a first subset of said plurality of carriers, said first subset comprising said first carrier; and
(2) a second carrier group comprising a subset of said at least one additional carrier;
b) transmitting, by said base station to said wireless device, signals on said plurality of carriers, wherein downlink frames and subframes transmission timing for said first carrier and said at least one additional carrier are substantially time aligned with each other;
c) receiving, by said base station, uplink signals from said wireless device on said plurality of carriers; and
d) transmitting, by said base station to said wireless device, at least one time alignment command, said time alignment command comprising:
i) a time adjustment value; and
ii) an index identifying one carrier group; and
wherein uplink transmission timing of frames and subframes in said first carrier group and said second carrier group employ different synchronization signals on different carriers as timing reference and are adjusted in response to different time alignment commands.

18. The method of claim 17, further comprising:
a) receiving, by said base station, a plurality of radio capability parameters from said wireless device on said first carrier, said plurality of radio capability parameters comprising at least one parameter indicating whether said wireless device supports configuration of a plurality of carrier groups; and
b) if said plurality of radio capability parameters indicates that said wireless device supports configuration of a plurality of carrier groups, said base station, selectively based on at least one criterion, transmitting said at least one RRC control message to cause configuration of said plurality of carrier groups in said wireless device.

19. The method of claim 17, wherein:
a) uplink transmissions by said wireless device in said first carrier group employs a first synchronization signal transmitted on a first downlink carrier of said first carrier as a timing reference; and
b) uplink transmissions by said wireless device in said second carrier group employs a second synchronization signal transmitted on one of at least one downlink carrier in said second carrier group.

\* \* \* \* \*

UNITED STATES PATENT AND TRADEMARK OFFICE
CERTIFICATE OF CORRECTION

PATENT NO. : 8,395,985 B2
APPLICATION NO. : 13/556165
DATED : March 12, 2013
INVENTOR(S) : Esmael Hejazi Dinan It is certified that error appears in the above-identified patent and that said Letters Patent is hereby corrected as shown below:

In the Claims:

Column 36, Lines 65-67
Claim 17(a):
Replace "transmitting, by said base station, at least one radio resource control message" to "a) transmitting, by a base station, at least one radio resource control message."

Column 37, Lines 1-3
Claim 17(a)(i):
Replace "causing configuration of a plurality of carriers comprising a first carrier and at least one additional carrier in said wireless device" to "causing configuration of a plurality of carriers comprising a first carrier and at least one additional carrier in a wireless device".

Signed and Sealed this
Twenty-ninth Day of October, 2013

Teresa Stanek Rea
*Deputy Director of the United States Patent and Trademark Office*